US012206109B2

(12) United States Patent
Ito et al.

(10) Patent No.: US 12,206,109 B2
(45) Date of Patent: Jan. 21, 2025

(54) ACTIVE MATERIAL, METHOD OF MANUFACTURING THE SAME, ELECTRODE, AND SECONDARY BATTERY

(71) Applicant: MURATA MANUFACTURING CO., LTD., Kyoto (JP)

(72) Inventors: Daisuke Ito, Kyoto (JP); Yuji Kintaka, Kyoto (JP); Yasutaka Sugimoto, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 460 days.

(21) Appl. No.: 17/704,163

(22) Filed: Mar. 25, 2022

(65) Prior Publication Data

US 2022/0216478 A1 Jul. 7, 2022

Related U.S. Application Data

(63) Continuation of application No. PCT/JP2020/034059, filed on Sep. 9, 2020.

(30) Foreign Application Priority Data

Sep. 25, 2019 (JP) .................... 2019-174299

(51) Int. Cl.
*H01M 4/58* (2010.01)
*H01M 4/04* (2006.01)
(Continued)

(52) U.S. Cl.
CPC ....... *H01M 4/5825* (2013.01); *H01M 4/0471* (2013.01); *H01M 4/364* (2013.01);
(Continued)

(58) Field of Classification Search
CPC .. H01M 4/5825; H01M 4/0471; H01M 4/364; H01M 4/381; H01M 4/583; H01M 10/0525
See application file for complete search history.

(56) References Cited

U.S. PATENT DOCUMENTS

2007/0248525 A1  10/2007  Fukuoka et al.
2014/0147744 A1   5/2014  Nemoto et al.
(Continued)

FOREIGN PATENT DOCUMENTS

JP   863103815 A    5/1988
JP   2007290890 A  11/2007
(Continued)

OTHER PUBLICATIONS

International Search Report of corresponding PCT application PCT/JP2020/034059, dated Nov. 2, 2020.
(Continued)

*Primary Examiner* — Olatunji A Godo
(74) *Attorney, Agent, or Firm* — K&L Gates LLP

(57) ABSTRACT

An active material includes, as constituent elements, silicon, oxygen, a first element, a second element, and a third element. The first element includes boron, phosphorus, or both. The second element includes at least one of an alkali metal element, a transition element, or a typical element. The typical element excludes silicon, oxygen, boron, phosphorus, an alkali metal element, and an alkaline earth metal element. The third element includes an alkaline earth metal element. The content of silicon with respect to all the constituent elements excluding oxygen and carbon is 60 at % or greater and 98 at % or less. The content of the first element with respect to all the constituent elements excluding oxygen and carbon is 1 at % or greater and 25 at % or less. The content of the second element with respect to all the constituent elements excluding oxygen and carbon is 1
(Continued)

at % or greater and 34 at % or less. The content of the third element with respect to all the constituent elements excluding oxygen and carbon is 0 at % or greater and 6 at % or less. A first peak is detected in an XPS spectrum of Si2p relating to the active material. The XPS spectrum of Si2p is measured using X-ray photoelectron spectroscopy (XPS). The first peak includes an apex within a range of a binding energy of 102 eV or greater and 105 eV or less, and a shoulder on a smaller binding energy side of the apex. A second peak is detected in a Raman spectrum relating to the active material. The Raman spectrum is measured using Raman spectroscopy. The second peak includes an apex within a range of a Raman shift of 435 $cm^{-1}$ or greater and 465 $cm^{-1}$ or less.

15 Claims, 9 Drawing Sheets

(51) Int. Cl.
*H01M 4/36* (2006.01)
*H01M 4/38* (2006.01)
*H01M 4/583* (2010.01)
*H01M 10/0525* (2010.01)
*H01M 4/02* (2006.01)

(52) U.S. Cl.
CPC ........... *H01M 4/381* (2013.01); *H01M 4/583* (2013.01); *H01M 10/0525* (2013.01); *H01M 2004/027* (2013.01)

(56) References Cited

U.S. PATENT DOCUMENTS

| | | |
|---|---|---|
| 2015/0228965 A1 | 8/2015 | Ushiroda et al. |
| 2018/0047981 A1* | 2/2018 | Ito .......................... H01M 4/582 |
| 2019/0341652 A1 | 11/2019 | Laughman et al. |
| 2020/0176760 A1 | 6/2020 | Ito et al. |

FOREIGN PATENT DOCUMENTS

| | | |
|---|---|---|
| JP | 2011192453 A | 9/2011 |
| JP | 2013047162 A | 3/2013 |
| JP | 2013067543 A | 4/2013 |
| JP | 2014232680 A | 12/2014 |
| JP | 2019518311 A | 6/2019 |
| WO | 2013005704 A1 | 1/2013 |
| WO | 2014050086 A1 | 4/2014 |
| WO | 2019031518 A1 | 2/2019 |

OTHER PUBLICATIONS

Chinese Office Action issued Jun. 30, 2023 in corresponding Chinese Application No. 202080066368.1.

* cited by examiner

Binding Energy

Raman Shift

ACTIVE MATERIAL, METHOD OF MANUFACTURING THE SAME, ELECTRODE, AND SECONDARY BATTERY

CROSS REFERENCE TO RELATED APPLICATIONS

The present application is a continuation of PCT application no. PCT/JP2020/034059 filed on Sep. 9, 2020, which claims priority to Japanese patent application no. JP2019-174299 filed on Sep. 25, 2019, the entire contents of which are being incorporated by reference.

BACKGROUND

The present technology relates to an active material including silicon and oxygen as constituent elements, a method of manufacturing the active material, an electrode including the active material, and a secondary battery including the active material.

Various electronic apparatuses such as mobile phones have been widely used. Such widespread use has promoted the development of a secondary battery that is smaller in size and lighter in weight and allows for a higher energy density, as a power source. The secondary battery includes electrodes, i.e., a positive electrode and a negative electrode, and an electrolytic solution. The electrodes include an active material contributing to an electrode reaction. A configuration of the secondary battery influences a battery characteristic. Accordingly, the configuration of the secondary battery has been considered in various ways.

For example, silicon dioxide is heated to generate a silicon oxide gas, following which the silicon oxide gas is condensed into silicon oxide ($SiO_x$) powder. To improve a cyclability characteristic or other characteristics of a secondary battery including silicon oxide as a negative electrode active material, different elements are added to the silicon oxide. To obtain the negative electrode active material for high-capacity applications, a pyroxene silicic acid compound and a reduced product of tin oxide ($SnO_x$) acquired as a result of heat reduction using a reducing gas are used.

SUMMARY

The present disclosure relates to an active material including silicon and oxygen as constituent elements, a method of manufacturing the active material, an electrode including the active material, and a secondary battery including the active material.

Although consideration has been given in various ways to improve a battery characteristic of the secondary battery, the battery characteristic of the secondary battery still remains insufficient. Accordingly, there is still room for improvement in terms of the battery characteristic of the secondary battery.

The technology of the present disclosure has been made in view of such an issue, and thus to provide, for example, an active material, a method of manufacturing the active material, an electrode, and a secondary battery that are each able to achieve a superior battery characteristic according to an embodiment.

An active material according to an embodiment of the technology includes silicon (Si), oxygen (O), a first element, a second element, and a third element as constituent elements. The first element includes boron (B), phosphorus (P), or both. The second element includes at least one of an alkali metal element, a transition element, or a typical element. The typical element excludes silicon, oxygen, boron, phosphorus, an alkali metal element, and an alkaline earth metal element. The third element includes an alkaline earth metal element. The content of silicon with respect to all the constituent elements excluding oxygen and carbon (C) is 60 at % or greater and 98 at % or less. The content of the first element with respect to all the constituent elements excluding oxygen and carbon is 1 at % or greater and 25 at % or less. The content of the second element with respect to all the constituent elements excluding oxygen and carbon is 1 at % or greater and 34 at % or less. The content of the third element with respect to all the constituent elements excluding oxygen and carbon is 0 at % or greater and 6 at % or less. A first peak is detected in an XPS spectrum of Si2p relating to the active material. The XPS spectrum of Si2p is measured using X-ray photoelectron spectroscopy (XPS) and defined by a horizontal axis indicating a binding energy (eV) and a vertical axis indicating a spectrum intensity. The first peak includes an apex within a range of the binding energy of 102 eV or greater and 105 eV or less, and a shoulder on a smaller binding energy side of the apex. A second peak is detected in a Raman spectrum relating to the active material. The Raman spectrum is measured using Raman spectroscopy and defined by a horizontal axis indicating a Raman shift ($cm^{-1}$) and a vertical axis indicating a spectrum intensity. The second peak includes an apex within a range of the Raman shift of 435 $cm^{-1}$ or greater and 465 $cm^{-1}$ or less.

A method of manufacturing an active material according to an embodiment of the technology includes: preparing silicate glass including, as constituent elements, silicon (Si), oxygen (O), a first element including boron (B), phosphorus (P), or both, a second element including at least one of an alkali metal element, a transition element, or a typical element excluding silicon, oxygen, boron, phosphorus, an alkali metal element, and an alkaline earth metal element, and a third element including an alkaline earth metal element; mixing the silicate glass with a carbon source to thereby obtain a mixture of the silicate glass and the carbon source; and heating the mixture to thereby manufacture an active material including silicon, oxygen, the first element, the second element, and the third element as constituent elements. In the active material, the content of silicon with respect to all the constituent elements excluding oxygen and carbon (C) is 60 at % or greater and 98 at % or less. The content of the first element with respect to all the constituent elements excluding oxygen and carbon is 1 at % or greater and 25 at % or less. The content of the second element with respect to all the constituent elements excluding oxygen and carbon is 1 at % or greater and 34 at % or less. The content of the third element with respect to all the constituent elements excluding oxygen and carbon is 0 at % or greater and 6 at % or less.

An electrode according to an embodiment of the technology includes an active material. The active material has a configuration similar to the configuration of the active material according to the embodiment of the technology described above.

A secondary battery according to an embodiment of the technology includes a positive electrode, a negative electrode, and an electrolytic solution. The negative electrode includes a negative electrode active material. The negative electrode active material has a configuration similar to the configuration of the active material according to an embodiment of the technology.

According to the active material, the electrode, or the secondary battery of the embodiment of the technology, the active material, i.e., the negative electrode active material, includes silicon, oxygen, the first element, the second element, and the third element as constituent elements, and the content of each of the constituent elements satisfies the condition described above. Further, the first peak described above is detected in the XPS spectrum of Si2p relating to the active material measured using X-ray photoelectron spectroscopy, and the second peak described above is detected in the Raman spectrum relating to the active material measured using Raman spectroscopy. Accordingly, it is possible to obtain a superior battery characteristic.

According to the method of manufacturing the active material of an embodiment of the technology, the silicate glass including silicon, oxygen, the first element, the second element, and the third element as constituent elements is mixed with the carbon source, following which the mixture of the silicate glass and the carbon source is heated to thereby manufacture the active material. The content of each of the constituent elements in the active material satisfies the condition described above. Accordingly, it is possible to obtain an active material achieving a superior battery characteristic.

Note that effects of the technology are not necessarily limited to the effects described above and may include any of a series of suitable effects including described below in relation to the technology according to an embodiment.

DETAILED DESCRIPTION

One or more embodiments of the technology of the present disclosure are described below in detail with reference to the drawings.

First, a description is given of an active material according to an embodiment of the technology. Note that a manufacturing method of an active material according to an embodiment of the technology is a manufacturing method of the active material described herein, and is therefore descried below together.

The active material is a material contributing to an electrode reaction. More specifically, the active material is a material into which an electrode reactant is insertable and from which an electrode reactant is extractable. The active material is used as an electrode material of a device that is operable using the electrode reaction. In this case, the electrode reactant is inserted into the active material or extracted from the active material in an ionic state. Note that the active material may be used as an electrode material for a positive electrode (a positive electrode active material) or an electrode material for a negative electrode (a negative electrode active material).

Applications of the active material are not limited to particular applications as long as they are devices that are operable using an electrode reaction. Specifically, examples of the applications of the active material include a battery and a capacitor. Note that the battery may be a primary battery or a secondary battery.

The electrode reactant is not limited to a particular kind and may be a light metal such as an alkali metal, an alkaline earth metal, or aluminum. Examples of the alkali metal include lithium, sodium, and potassium, and examples of the alkaline earth metal include beryllium, magnesium, and calcium.

Figure 1:
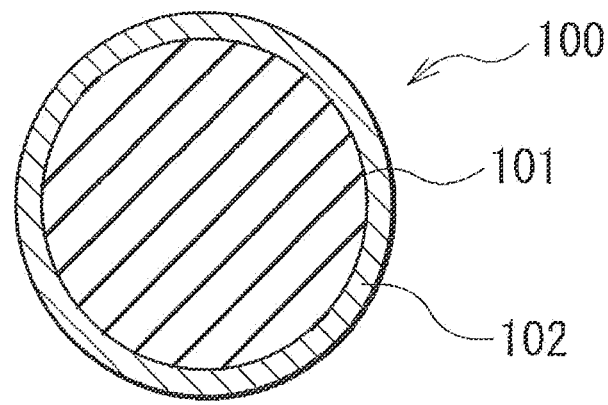
FIG. 1 is a sectional view of a configuration of an active material according to an embodiment of the technology.

First, a description is given of a configuration of the active material. FIG. 1 illustrates a sectional configuration of an active material 100, which is an example of the active material.

As illustrated in FIG. 1, the active material 100 includes a center part 101 and a covering part 102. Note that the center part 101 has a spherical three-dimensional shape in FIG. 1 for simple illustration; however, the three-dimensional shape of the center part 101 is not limited to a particular shape.

The center part 101 is a main part of the active material 100 into which the electrode reactant is inserted and from which the electrode reactant is extracted. The center part 1101 includes carbon-reduced silicate glass. Unlike ordinary silicate glass (hereinafter simply referred to as "silicate glass"), the carbon-reduced silicate glass is formed by a carbon reduction treatment on silicate glass using a carbon source as a reducing agent, as to be described later. Note that only one kind of the carbon-reduced silicate glass may be included, or two or more kinds of the carbon-reduced silicate glass may be included.

In the carbon-reduced silicate glass formed by the carbon reduction treatment, a reduction reaction of the silicate glass which is a raw material is facilitated due to the use of the carbon source as the reducing agent. This allows the silicate glass to be so reduced (activated) that the electrode reactant is sufficiently inserted and extracted from the silicate glass. That is, the silicate glass is hardly reduced by an ordinary reduction treatment in which a reducing gas is used as a reducing agent, whereas the silicate glass is sufficiently reduced in a special reduction treatment, i.e., the carbon reduction treatment, in which the carbon source is used as a reducing agent. Thus, the carbon-reduced silicate glass has a physical property different from the physical property of silicate glass. Details of the physical property of the carbon-reduced silicate glass will be described later.

Specifically, the carbon-reduced silicate glass includes silicon, oxygen, a first element, a second element, and a third element, as constituent elements.

The content of each constituent element with respect to all the constituent elements excluding oxygen and carbon in the carbon-reduced silicate glass is set within a predetermined range. In a case where the total content of all the constituent elements excluding oxygen and carbon is assumed to be 100 at %, the content of each constituent element represents the atomic percent of the content of the constituent element. Note that the content (atomic percent) of each constituent element is measured by analyzing the carbon-reduced silicate glass using scanning electron microscope (SEM) and energy dispersive X-ray spectroscopy (EDX) spectrometry.
(Silicon)

Silicon is a primary constituent element of the carbon-reduced silicate glass. The content of silicon with respect to all the constituent elements excluding oxygen and carbon is from 60 at % to 98 at % both inclusive.

Oxygen is another primary constituent element of the carbon-reduced silicate glass that forms an oxide with silicon. Thus, the carbon-reduced silicate glass includes $SiO_x$ (where x satisfies $0<x\leq2$) as a primary component. The $SiO_x$ is supposed to include nano silicon (Si) dispersed in amorphous silicon dioxide ($SiO_2$). Alternatively, the $SiO_x$ is supposed to include, in the glass component, silicon into which electrode reactant is sufficiently insertable and from which electrode reactant is sufficiently extractable.

The first element includes one or more network-forming elements. More specifically, the first element includes boron, phosphorus, or both. A reason for this is that silicate glass including the first element in addition to silicon and oxygen as constituent elements is easily and sufficiently reduced in the carbon reduction treatment. This facilitates easy and stable formation of the carbon-reduced silicate glass in the carbon reduction treatment.

The term "network-forming element" is a generic term for a series of elements capable of forming a network-forming body (network-forming oxide). The first element may thus include, for example, germanium (Ge) in addition to boron and phosphorus described above.

The content of the first element with respect to all the constituent elements excluding oxygen and carbon is from 1 at % to 25 at % both inclusive. A reason for this is that the silicate glass is easily and sufficiently reduced in the carbon reduction treatment.

Note that, in a case where the first element includes two or more elements, the content of the first element is the sum of the contents of these elements. Likewise, in a case where the second or third element includes two or more elements, the content of the second or third element to be described later is the sum of the contents of these constituent elements.

The second element includes one or more of an alkali metal element, a transition element, and a typical element. A reason for this is that, unlike the third element to be described later, the second element hardly affects the reducibility of the silicate glass in the carbon reduction treatment even if included in the silicate glass as a constituent element. Accordingly, the silicate glass is sufficiently reduced in the carbon reduction treatment even if the second element is included in the silicate glass as a constituent element.

The term "alkali metal element" is a generic term for a series of elements belonging to the Group 1 in the long period periodic table. Specifically, examples of the alkali metal element include lithium (Li), sodium (Na), and potassium (K).

The term "transition element" is a generic term for a series of elements belonging to any of Groups 3 to 11 in the long period periodic table. Specifically, examples of the transition element include scandium (Sc), titanium (Ti), zirconium (Zr), and cerium (Ce). However, the transition element is not limited to a particular kind as long as the transition element belongs to any of Groups 3 to 11 in the long period periodic table. Thus, the examples of the transition element may further include elements including, without limitation, lanthanum (La), hafnium (Hf), tantalum (Ta), and tungsten (W) other than the series of elements such as scandium described above.

The term "typical element" is a generic term for a series of elements belonging to any of Groups 1, 2, and 12 to 18 in the long period periodic table. However, silicon, oxygen, boron, phosphorus, an alkali metal element, and an alkaline earth metal element are excluded from the typical element described here. Thus, examples of the typical element described here include aluminum (Al), sulfur (S), chlorine (Cl), zinc (Zn), and bismuth (Bi). However, the typical element is not limited to a particular kind as long as the typical element belongs to any of Groups 1, 2, and 12 to 18 in the long period periodic table. Thus, the examples of the typical element may further include elements including, without limitation, antimony (Sb) other than the series of elements such as aluminum described above.

The content of the second element with respect to all the constituent elements excluding oxygen and carbon is from 1 at % to 34 at % both inclusive. A reason for this is that the silicate glass is easily and sufficiently reduced in the carbon reduction treatment even if the second element is included in the silicate glass as a constituent element.

The third element is an optional constituent element of the carbon-reduced silicate glass. The carbon-reduced silicate glass may thus include the third element as a constituent element or may not include the third element as a constituent element.

The third element includes one or more alkaline earth metal elements. The term "alkaline earth metal element" is a generic term for a series of elements belonging to Group 2 in the long period periodic table. Specifically, examples of the third element include magnesium (Mg), calcium (Ca), strontium (Sr), and barium (Ba).

Note that the content of the third element with respect to all the constituent elements excluding oxygen and carbon is from 0 at % to 6 at % both inclusive.

The reason why the lower limit of the content of the third element is 0 at % is that the carbon-reduced silicate glass may not include the third element as a constituent element since the third element is an optional constituent element of the carbon-reduced silicate glass, as described above.

The reason why the upper limit of the content of the third element is 6 at % is that the content of the third element should be within a range that does not affect the reducibility of the silicate glass in the carbon reduction treatment since the third element affects the reducibility of the silicate glass in the carbon reduction process, as described above.

Specifically, in a case where the content of the third element is greater than 6 at %, the silicate glass is hardly reduced in the carbon reduction treatment because the amount of the third element present in the silicate glass is excessively large. As a result, substantially no carbon-reduced silicate glass is manufactured. In contrast, in a case where the content of the third element is 6 at % or less, the silicate glass is easily reduced in the carbon reduction treatment because the amount of the third element present in the silicate glass is appropriately decreased. As a result, the carbon-reduced silicate glass is substantially manufactured.

The covering part 102 covers a portion or all of a surface of the center part 101. Note that, in a case where the covering part 102 covers a portion of the surface of the center part 101, a plurality of locations separated from each other on the surface of the center part 101 may be covered with the covering parts 102.

The covering part 102 includes carbon as a constituent element to have an electrically conductive property. A reason for this is that the electrically conductive property of the active material 100 as a whole enhances in a case where the surface of the center part 101 is covered with the covering part 102 having an electrically conductive property, as compared with a case where the surface of the center part 101 is not covered with the covering part 102. A material included in the covering part 102 is not limited to a particular material as long as carbon is included therein as a constituent element.

Specifically, the covering part 102 is formed as a coating film covering the surface of the center part 101 as a result of thermal decomposition of a carbon source (a mixture of silicate glass and a reducing agent) when the carbon source is heated in a manufacturing process of the active material (carbon reduction treatment) as to be described later. In this case, the covering part 102 may include the carbon source as it is, may include a decomposition product of the carbon source (organic substance decomposition carbon), or may include both of them.

The thickness of the covering part 102 is not limited to a particular thickness. A reason for this is that the electrically conductive property of the active material 100 as a whole enhances in a case where the covering part 102 is present even in a slight amount on the surface of the center part 101, as compared with a case where the covering part 102 is not present at all on the surface of the center part 101.

Next, a description is given of physical properties of the active material 100. In the following, two physical properties are described in order that are specified on the basis of the results of analyses of the active material 100 using X-ray photoelectron spectroscopy (XPS) and Raman spectroscopy.

Figure 2:
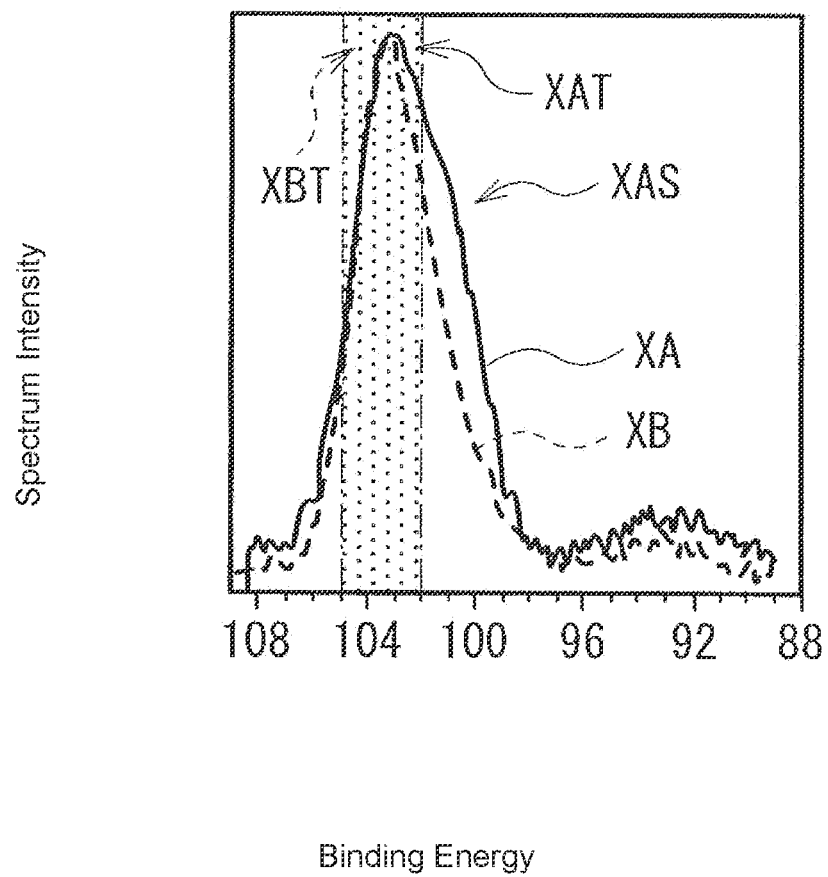
FIG. 2 is an example of a result of analysis (an XPS spectrum of Si2p) of the active material using XPS.

FIG. 2 illustrates an example of a result of the analysis (an XPS spectrum of Si2p) of the active material 100 using XPS for describing a first physical property. The XPS spectrum is defined by a horizontal axis representing the binding energy (eV), and a vertical axis representing the spectrum intensity. Note that the result of the analysis using XPS described here is an analysis result obtained after argon (Ar) ion sputtering for a sputtering time of 1000 seconds.

FIG. 2 also illustrates an XPS spectrum of the silicate glass indicated with a dashed line in addition to the XPS spectrum of the carbon-reduced silicate glass indicated with a solid line. That is, the carbon-reduced silicate glass of which XPS spectrum is detected as indicated with the solid line is obtainable by conducting the carbon reduction treatment on the silicate glass of which XPS spectrum is detected as indicated with the dashed line. Note that shading is applied to the range of the binding energy from 102 eV to 105 eV both inclusive.

As illustrated in FIG. 2, the carbon-reduced silicate glass has a physical property different from the physical property of the silicate glass in terms of the result of analysis using XPS or the shape of the XPS spectrum.

Specifically, a peak XA (first peak) is detected in the solid-line XPS spectrum relating to the carbon-reduced silicate glass. The peak XA has an apex XAT within the range of the binding energy from 102 eV to 105 eV both inclusive, and a shoulder XAS on a smaller binding energy side of the apex XAT (i.e., on the right side in FIG. 2). The shoulder XAS is a shoulder-like portion protruding toward the low binding energy side from a portion of the middle of the peak XA having the apex XAT. That is, the shoulder XAS is a stepped portion.

In contrast, a peak XB is detected in the dashed-line XPS spectrum relating to the silicate glass. The peak XB has an apex XBT within the range of the binding energy from 102 eV to 105 eV both inclusive, but does not have a shoulder corresponding to the shoulder XAS on a smaller binding energy side of the apex XBT.

The following tendencies are derived from these results of the analysis of the active material 100 using XPS or the shapes of XPS spectra. Regarding the carbon-reduced silicate glass, the peak XA having the apex XAT and the shoulder XAS is detected because silicate glass, which is the raw material of the carbon-reduced silicate glass, has been sufficiently reduced by the carbon reduction treatment. In contrast, regarding the silicate glass, the peak XB having only the apex XBT is detected because the silicate glass has not been subjected to the carbon reduction treatment yet. Accordingly, it is possible to identify which of the carbon-reduced silicate glass or the silicate glass the analyte is on the basis of the results of analysis using XPS. The carbon-reduced silicate glass manufactured by the carbon reduction treatment therefore differs in physical property from the silicate glass in that the above-described condition is satisfied in terms of XPS.

Likewise, it is possible to identify the center part 101 of the active material 100 by the above-described identification method. That is, the center part 101 includes the carbon-reduced silicate glass in a case where the peak XA is detected by the analysis of the center part 101 using XPS, whereas the center part 101 includes the silicate glass in a case where the peak XB is detected.

Note that the silicate glass is hardly reduced by the ordinary reduction treatment, as described above. Accordingly, even if the ordinary reduction treatment is performed using the silicate glass, the silicate glass is hardly reduced and expected to exhibit the peak XB rather than the peak XA.

Here, the peak XA relating to the carbon-reduced silicate glass has the shoulder XAS, whereas the peak XB relating to the silicate glass has no shoulder, as described above. Accordingly, it is also possible to identify which of the carbon-reduced silicate glass or the silicate glass the analyte is by the following methods.

First, the width of the middle of the peak XA in a height direction is larger than the width of the middle of the peak XB in the height direction. The half-width of the peak XA is therefore larger than the half-width of the peak XB. More specifically, the half-width of the peak XA is 4.0 eV or greater. Although the half-width of the peak XA is 4.0 eV or greater, the half-width of the peak XB is not 4.0 eV or greater. Accordingly, it is also possible to identify which of the reduced silicate glass or the silicate glass the analyte is by measuring the half-width instead of examining the presence or absence of the shoulder XAS. That is, it is possible to identify the kind of the analyte by measuring the half width even in a case where it is difficult to determine the presence or absence of the shoulder XAS because the shoulder XAS is small.

Second, the area of the middle of the peak XA is larger than the area of the middle of the peak XB. Accordingly, in a case where each of the peaks XA and XB is decomposed into five Si-attributed peaks (a $Si^0$ peak, a $Si^{1+}$ peak, a $Si^{2+}$ peak, a $Si^{3+}$ peak, and a $Si^{4+}$ peak), the area ratio S2/S1 of the peak XA is larger than the area ratio S2/S1 of the peak XB. More specifically, the area ratio S2/S1 of the peak XA is 0.85 or greater.

Here, the area S1 is the area of the $Si^{4+}$ peak, while the area S2 is the sum of the area of the $Si^0$ peak, the area of the $Si^{1+}$ peak, the area of the $Si^{2+}$ peak, and the area of the $Si^{3+}$ peak. Each of the areas S1 and S2 may be calculated using an analysis (arithmetic) function of an XPS device.

Although the area ratio S2/S1 of the peak XA is 0.85 or greater, the area ratio S2/S1 of the peak XB is not 0.85 or greater. Accordingly, it is also possible to identify which of the reduced silicate glass or the silicate glass the analyte is by measuring the area ratio S2/S1 instead of examining the presence or absence of the shoulder XAS. That is, it is possible to identify the kind of the analyte by measuring the half width even in a case where it is difficult to determine the presence or absence of the shoulder XAS because the shoulder XAS is small, as described above.

Figure 3:
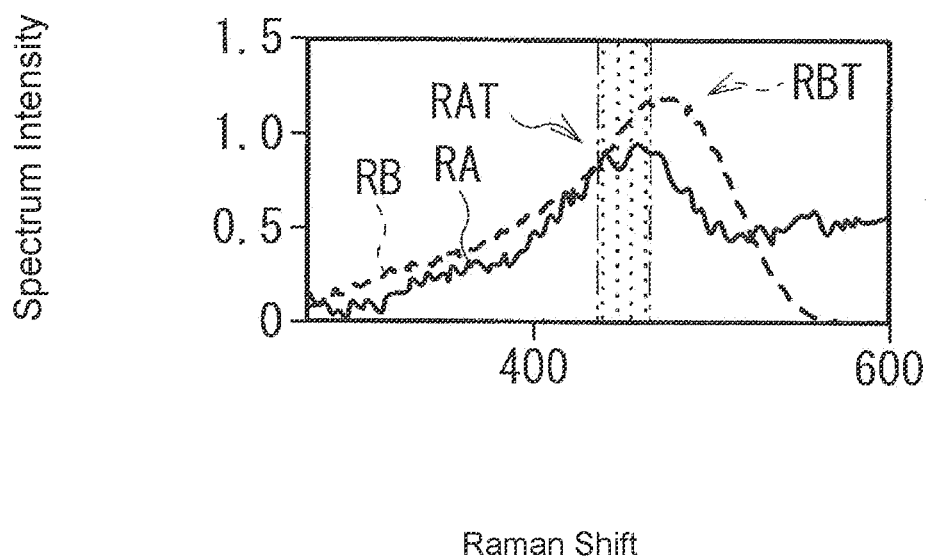
FIG. 3 is an example of a result of analysis (a Raman spectrum) of the active material using Raman spectroscopy.

FIG. 3 illustrates an example of a result of the analysis (a Raman spectrum) of the active material 100 using Raman spectroscopy for describing a second physical property. The Raman spectrum is defined by a horizontal axis representing the Raman shift ($cm^{-1}$) and a vertical axis representing the spectrum intensity.

FIG. 3 also illustrates a Raman spectrum of the silicate glass indicated with a dashed line in addition to the Raman spectrum of the carbon-reduced silicate glass indicated with a solid line. That is, the carbon-reduced silicate glass of which Raman spectrum is detected as indicated with the solid line is obtainable by conducting the carbon reduction treatment on the silicate glass of which Raman spectrum is detected as indicated with the dashed line. Note that shading is applied to the range of the Raman shift from 435 $cm^{-1}$ to 465 $cm^{-1}$ both inclusive.

As illustrated in FIG. 3, the carbon-reduced silicate glass has a physical property different from the physical property of the silicate glass in terms of the result of analysis using Raman spectroscopy or the shape of the Raman spectrum.

Specifically, a peak RA (second peak) is detected in the solid-line Raman spectrum relating to the carbon-reduced silicate glass. The peak RA has an apex RAT within the range of the Raman shift from 435 $cm^{-1}$ to of 465 $cm^{-1}$ both inclusive.

In contrast, a peak RB is detected in the dashed-line Raman spectrum relating to the silicate glass. The peak RB has an apex RBT outside the range of the binding energy from 435 $cm^{-1}$ to 465 $cm^{-1}$ both inclusive rather than within the range. Specifically, the peak RB has the apex RBT within the range of the binding energy from 470 $cm^{-1}$ to 490 $cm^{-1}$ both inclusive. Note that, just for reference, a peak having an apex within the range of the binding energy from 510 $cm^{-1}$ to 525 $cm^{-1}$ both inclusive is detected in the Raman spectrum relating to a single substance of silicon having crystallinity.

The following tendencies are derived from these results of the analysis of the active material 100 using Raman spectroscopy or the shape of Raman spectrum. Regarding the carbon-reduced silicate glass, the peak RA having the apex RAT within the range from 435 $cm^{-1}$ to 465 $cm^{-1}$ both inclusive is detected because silicate glass, which is the raw material of the carbon-reduced silicate glass, has been sufficiently reduced by the carbon reduction treatment. In contrast, regarding the silicate glass, the peak RB having the apex RBT outside the above-described range is detected because the silicate glass has not been subjected to the carbon reduction treatment yet. The carbon-reduced silicate glass manufactured by the carbon reduction treatment therefore differs in physical property from the silicate glass in that the above-described condition is satisfied in terms of Raman spectroscopy.

Likewise, it is possible to identify the center part 101 of the active material 100 by the above-described identification method. That is, the center part 101 includes the carbon-reduced silicate glass in a case where the peak RA is detected by the analysis of the center part 101 using Raman spectroscopy, whereas the center part 101 includes the silicate glass in a case where the peak RB is detected.

Note that the silicate glass is hardly reduced by the ordinary reduction treatment, as described above. Accordingly, even if the ordinary reduction treatment is performed using the silicate glass, the silicate glass is hardly reduced and expected to exhibit the peak RB rather than the peak RA.

These results indicate that, in the case of the carbon-reduced silicate glass, the peak XA is detected in the XPS spectrum of Si2p measured using XPS, and the peak RA is detected in the Raman spectrum measured using Raman spectroscopy. Thus, the active material 100 includes the carbon-reduced silicate glass in a case where both of the peaks XA and RA described above are detected by analyzing the active material 100 (the center part 101) using both XPS and Raman spectroscopy.

In contrast, the active material 100 does not include the carbon-reduced silicate glass in a case where the peak XA, the peak RA, or both are not detected by analyzing the active material 100 using both XPS and Raman spectroscopy.

The reduced silicate glass included in the active material 100 (the center part 101) satisfies the two physical property conditions relating to XPS and Raman spectroscopy described above because the crystallinity of a glass material including the above-described $SiO_x$ as a primary component is optimized due to the reduction reaction of the reduced silicate glass which proceeds more easily than that of silicate glass. This makes it easy for the electrode reactants to be sufficiently and stably inserted into or extracted from the active material 100, and also continuously makes it easy for the electrode reactant to be inserted into or extracted from the active material 100 even if the electrode reaction is repeated.

Figure 4:
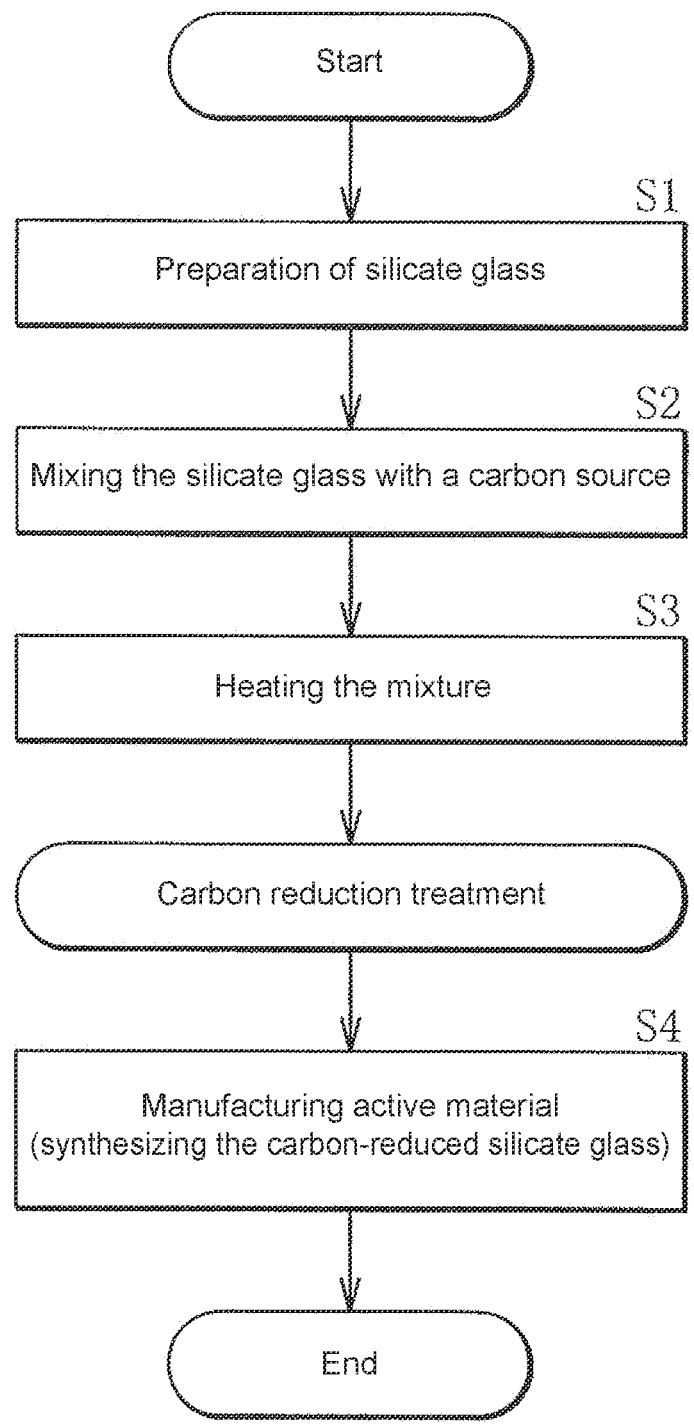
FIG. 4 is a flowchart for describing a method of manufacturing the active material according to an embodiment of the technology.

Next, a description is given of a method of manufacturing the active material 100. FIG. 4 is a flowchart for describing the method of manufacturing the active material 100. Step numbers in parentheses described below correspond to step numbers illustrated in FIG. 4.

In a case of manufacturing the active material 100, first, powder of silicate glass is prepared as a raw material (Step S1). In this case, previously synthesized silicate glass may be acquired by a method such as purchase, or silicate glass may be synthesized by a user.

The silicate glass does not satisfy the two physical property conditions relating to XPS and Raman spectroscopy described above because the silicate glass has not been subjected to the carbon reduction treatment yet. Except this point, the silicate glass has a configuration substantially similar to that of the carbon-reduced silicate glass. That is, the silicate glass includes silicon, oxygen, the first element, the second element, and the third element as constituent elements. Details of each of the first element, the second element, and the third element are as described above.

Note that, in a case of synthesizing the silicate glass, silicon dioxide ($SiO_2$) is mixed with respective sources of the first element, the second element, and the third element, following which the mixture is heated. Conditions including, without limitation, a heating temperature and a heating time may be set to any values.

These sources are compounds including respective constituent elements. The compounds are not limited to particular kinds. Specifically, the compounds are, for example, oxides of the respective constituent elements. That is, examples of the source of the first element include boron trioxide ($B_2O_5$) and phosphorus pentoxide ($P_2O_5$). Examples of the source of the second element include sodium oxide ($Na_2O$), potassium oxide ($K_2O$), scandium oxide (ScO), titanium oxide ($TiO_2$), zirconium oxide ($Zr_2O$), cerium oxide (CeO), hafnium oxide ($HfO_2$), tantalum oxide ($Ta_2O_5$), tungsten oxide ($WO_3$), aluminum oxide ($Al_2O_3$), phosphorus pentasulfide ($P_2S_5$), lithium sulfide ($Li_2S$), magnesium sulfide (MgS), silicon tetrachloride ($SiCl_4$), zinc oxide ($ZnO_2$), bismuth oxide (BiO), and antimony oxide ($Sb_2O_3$). Examples of the source of the third element include magnesium oxide (MgO), calcium oxide (CaO), strontium oxide (SrO), and barium oxide (BaO).

The silicon dioxide and the respective sources of the first element, the second element, and the third element are thereby mixed with each other to form a solid solution. A glass body is thereby formed which includes silicon, oxygen, the first element, the second element, and the third element as constituent elements. As a result, the silicate glass is synthesized.

After preparing the silicate glass, the silicate glass is mixed with a carbon source to obtain a mixture (Step S2). The term "carbon source" is a generic term for a material usable as a source of carbon. Specifically, the carbon source includes, without limitation, one or more of carbon materials and carbonizable organic substances. In other words, only a carbon material may be used, only a carbonizable organic substance may be used, or both of them may be used as the carbon source. Examples of the carbon material include non-fibrous carbon and fibrous carbon. Examples of the non-fibrous carbon include carbon black, and examples of the fibrous carbon include carbon nanotubes and carbon nanofibers. Examples of the carbonizable organic substance include saccharides and polymer compounds. Examples of the saccharide include sucrose, maltose, and cellulose. Examples of the polymer compounds include polyimide, polyvinylidene difluoride, polymethyl methacrylate, polyvinylpyrrolidone, polyvinyl alcohol, and polyacrylic acid. A reason why such a material is used as the carbon source is that the silicate glass is sufficiently reduced in the carbon reduction treatment. Another reason is that the covering part 102 having a sufficient electrically conductive property is easily and stably formed by using the carbon source, as to be described later.

In this case, the mixture may be stirred using a stirring device. Conditions including, without limitation, a stirring speed and a stirring time may be set to any values.

Alternatively, a mixture in a paste state may be obtained by adding materials including, without limitation, a binder and a solvent to the mixture. In this case, it is preferable to stir the mixture using the stirring device described above. The binder is not limited to a particular kind, and may be one or more polymer compounds including, without limitation, polyvinylidene difluoride, polyimide, and polymethyl methacrylate. The solvent is not limited to a particular kind, and may be one or more of organic solvents including, without limitation, N-methyl-2-pyrrolidone. Note that a binder solution in which a binder is previously dissolved in a solvent may be used.

Lastly, the mixture is heated (Step S3). In this case, one or more of heating devices including, without limitation, an oven may be used. Conditions including, without limitation, a heating temperature and a heating time may be set to any values. Specifically, the heating temperature is from 700° C. to 1400° C. both inclusive, and the heating time is from one hour to twenty hours both inclusive.

In a case where a mixture including a binder is used, the mixture may be heated in two stages. Specifically, first, the mixture is subjected to first heating to dry the mixture. Although the condition of the first heating is not limited to a particular condition, the heating temperature is from 40° C. to 500° C. both inclusive, and the heating time is from 10 minutes to three hours both inclusive. Thereafter, the dried mixture is pulverized. Lastly, the pulverized mixture is subjected to second heating. Although the condition of the second heating is not limited to a particular condition, the heating temperature is from 700° C. to 1200° C. both inclusive, and the heating time is from one hour to twenty hours both inclusive.

The silicate glass is thereby subjected to the carbon reduction treatment, and the silicate glass is sufficiently reduced using the carbon source as a reducing agent. In other words, the crystalline state of $SiO_x$ is so optimized that the electrode reactant is allowed to be sufficiently inserted and extracted. Accordingly, carbon-reduced silicate glass is synthesized that includes $SiO_x$ as a primary component. As a result, the center part 101 is formed that includes the carbon-reduced silicate glass.

In addition, carbon (organic substance decomposition carbon) adheres to the surface of the center part 101 in the carbon reduction treatment due to thermal decomposition of the carbon source used as the reducing agent, as described above. As a result, the covering part 102 including carbon as a constituent element is formed in such a manner as to cover the surface of the center part 101.

The active material 100 including the center part 101 and the covering part 102 is thereby manufactured (Step S4). In a case of synthesizing the active material (the center part 101 including the carbon-reduced silicate glass), the composition or another factor of the silicate glass used as a raw material is so adjusted that the content of each constituent element with respect to all the constituent elements excluding oxygen, lithium, and carbon satisfies the condition described above. Specifically, the adjustment is so performed that the content of silicon is from 60 at % to 98 at % both inclusive, the content of the first element is from 1 at % to 25 at % both inclusive, the content of the second element is from 1 at % to 34 at % both inclusive, and the content of the third element is from 0 at % to 6 at % both inclusive in the carbon-reduced silicate glass.

In the active material 100 (the center part 101) including the carbon-reduced silicate glass manufactured by the carbon reduction treatment, the physical property of the silicate glass has changed due to the carbon reduction process. The two physical property conditions relating to XPS and Raman spectroscopy described above are thus satisfied.

According to the active material 100 and the method manufacturing the active material 100 described above, the following action and effects are obtained.

The active material 100 includes silicon, oxygen, the first element, the second element, and the third element as constituent elements, and the content of each constituent element with respect to all the constituent elements excluding oxygen and carbon satisfies the condition described above. In addition, the peak XA (the apex XAT and the shoulder XAS) is detected as the result of analysis of the active material 100 measured by XPS (the XPS spectrum of Si2p), and the peak RA (the apex RAT) is detected as the result of analysis of the active material 100 measured by Raman spectroscopy (the Raman spectrum).

In this case, unlike the case where the two physical property conditions relating to XPS and Raman spectroscopy are not satisfied, the reduction reaction of the silicate glass sufficiently proceeds, as described above. Accordingly, the crystallinity of the glass material including $SiO_x$ as a primary component is optimized. This makes it easy for the electrode reactant to be sufficiently and stably inserted into or extracted from the active material 100, and also continuously makes it easy for the electrode reactant to be inserted into or extracted from the active material 100 even if the electrode reaction is repeated. It is therefore possible to obtain a superior battery characteristic in a secondary battery including the active material 100.

In particular, the half width of the peak XA may be 4.0 eV or greater. In this case, the center part 101 includes the carbon-reduced silicate compound satisfying the two physical property conditions relating to XPS and Raman spectroscopy. Thus, it is possible to obtain a superior battery characteristic as described above. Further, the area ratio S2/S1 may be 0.85 or greater in a case where the peak XA is decomposed into the five Si-attributed peaks (the $Si^0$ peak, the $Si^{1+}$ peak, the $Si^{2+}$ peak, the $Si^{3+}$ peak, and the $Si^{4+}$ peak). In this case, it is also possible to obtain a superior battery characteristic for a similar reason.

Further, the active material 100 may include the center part 101 and the covering part 102. This allows the surface of the center part 101 including the carbon-reduced silicate glass to be covered with the covering part 102 having an electrically conductive property. This improves the electrically conductive property of the active material 100 as a whole. It is therefore possible to obtain a higher effect.

According to the method of manufacturing the active material 100, the silicate glass including silicon, oxygen, the first element, the second element, and the third element as constituent elements is mixed with the carbon source, following which the mixture of the silicate glass and the carbon source is heated. Accordingly, the active material 100 is synthesized that includes the carbon-reduced silicate compound in which the content of each constituent element satisfies the condition described above and which satisfies the two physical property conditions relating to XPS and Raman spectroscopy. It is therefore possible to obtain the active material 100 that achieves a superior battery characteristic.

Moreover, to manufacture the active material 100 including $SiO_x$ as a primary component, only simple and inexpensive treatments including, without limitation, a mixing treatment and a heating treatment are needed. This eliminates the need to perform a complicated and expensive treatment such as codeposition of two vapor deposition sources ($SiO_2$ and Si). It is therefore possible to manufacture the active material 100 easily and stably at low costs.

In particular, the carbon source may include the material such as a carbon material. This allows the silicate glass to be sufficiently reduced in the carbon reduction treatment, and allows the covering part 102 having a sufficient electrically conductive property to be formed easily and stably. It is therefore possible to obtain a higher effect.

Next, a description is given of a secondary battery according to an embodiment of the technology, which is one application example of the active material described above. Note that an electrode according to an embodiment of the technology is a part (one constituent element) of the secondary battery, and is thus described below together.

A description is given below of a case where the active material 100 is used as a negative electrode active material, and is therefore used for a negative electrode.

The secondary battery described here is a secondary battery that obtains a battery capacity by utilizing insertion and extraction of the electrode reactant. The secondary battery includes a positive electrode, a negative electrode, and an electrolytic solution.

In the secondary battery, in order to prevent precipitation of the electrode reactant on a surface of the negative electrode in the middle of charging, a charge capacity of the negative electrode is greater than a discharge capacity of the positive electrode. In other words, an electrochemical capacity per unit area of the negative electrode is set to be greater than an electrochemical capacity per unit area of the positive electrode.

In the following, a description is given of an example case where the electrode reactant is lithium. A secondary battery utilizing insertion and extraction of lithium as the electrode reactant is a so-called lithium-ion secondary battery.

First, a secondary battery of a laminated-film type is described. The secondary battery of the laminated-film type includes a film 20 having softness or flexibility as an outer package member for containing a battery device.

Figure 5:
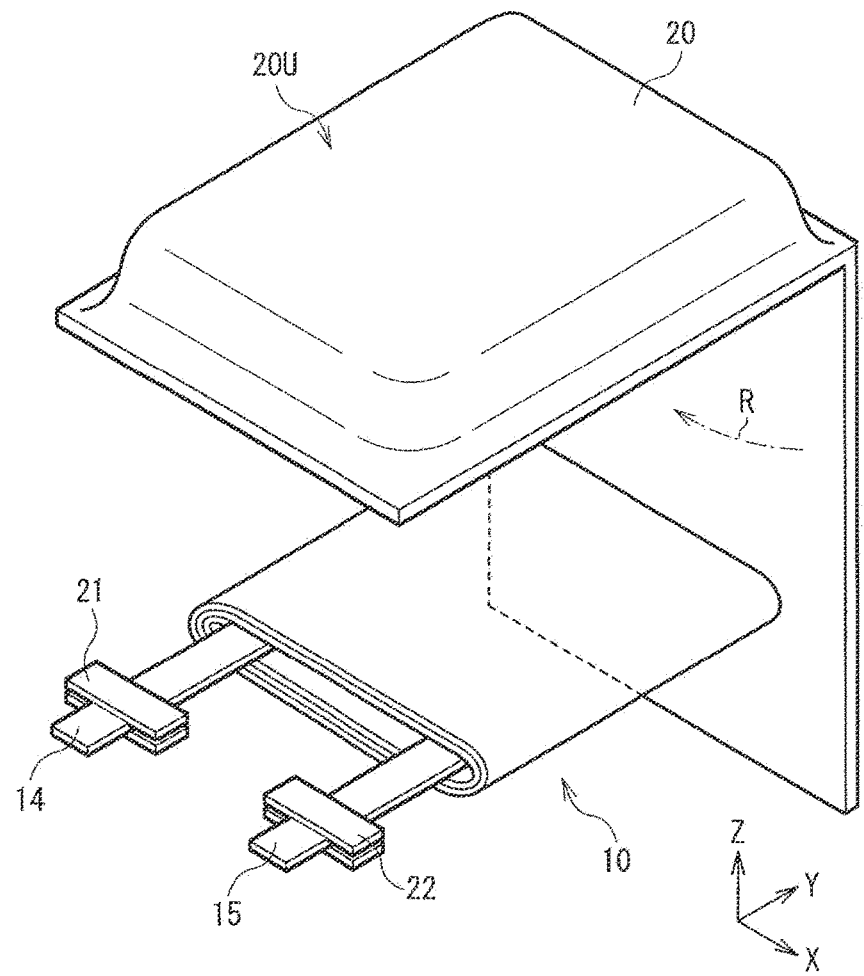
FIG. 5 is a perspective view of configurations of an electrode and a secondary battery of a laminated-film type according to an embodiment of the technology.
Figure 6:
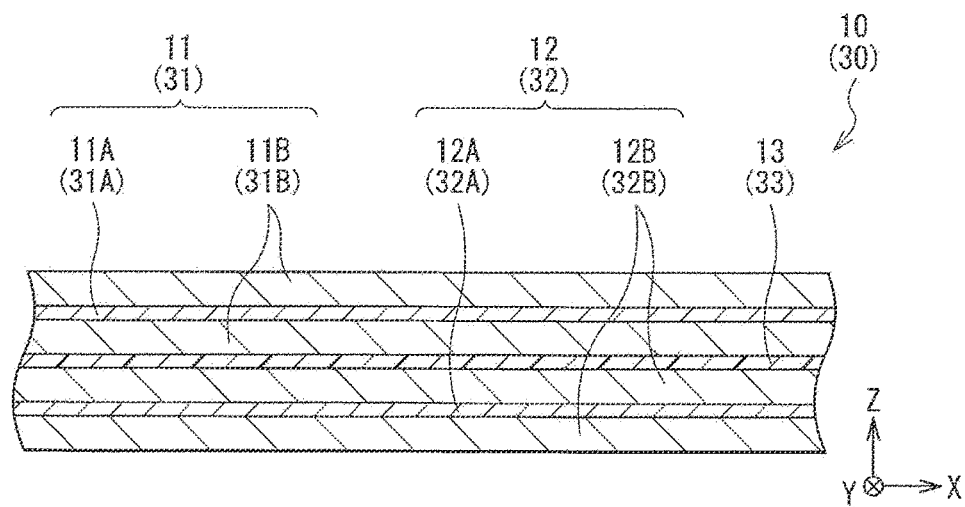
FIG. 6 is a sectional view of a configuration of a wound electrode body illustrated in FIG. 5.
Figure 7:
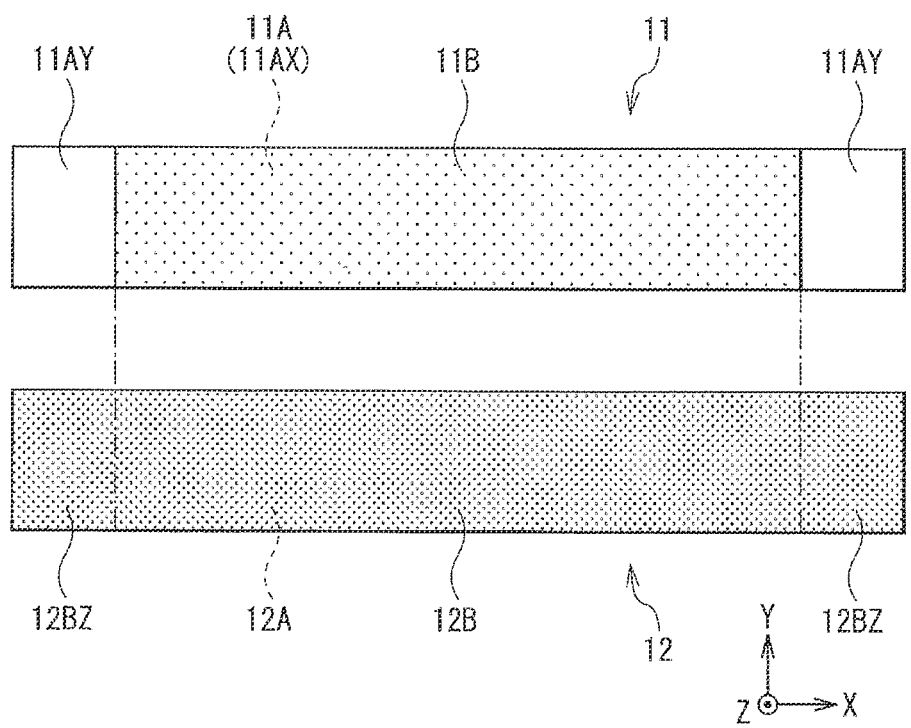
FIG. 7 is a plan view of respective configurations of a positive electrode and a negative electrode illustrated in FIG. 6.

FIG. 5 is a perspective view of a configuration of the secondary battery of the laminated-film type. FIG. 6 illustrates a sectional configuration of a wound electrode body 10 illustrated in FIG. 5. FIG. 7 illustrates a plan configuration of each of a positive electrode 11 and a negative electrode 12 illustrated in FIG. 6.

Note that FIG. 5 illustrates a state in which the wound electrode body 10 and the film 20 are separated away from each other. FIG. 6 illustrates only a portion of the wound electrode body 10. FIG. 7 illustrates a state in which the positive electrode 11 and the negative electrode 12 are separated away from each other.

As illustrated in FIG. 5, the secondary battery has the film 20 having a pouch-shape in which a wound-type battery device (the wound electrode body 10) is contained. A positive electrode lead 14 and a negative electrode lead 15 are coupled to the wound electrode body 10.

The film 20 is a single film member foldable in a direction of an arrow R (a dash-dot-dash line) illustrated in FIG. 5. The film 20 has a depression 20U. The depression 20U is a so-called deeply-drawn portion designed to contain the wound electrode body 10.

Specifically, the film 20 is a laminated film including three layers: a fusion-bonding layer, a metal layer, and a surface protective layer that are laminated in this order from an inner side. In a state where the film 20 is folded, outer edges of the fusion-bonding layer are fusion-bonded to each other. The fusion-bonding layer includes a polymer compound such as polypropylene. The metal layer includes a metal material such as aluminum. The surface protective layer includes a polymer compound such as nylon. Note that the number of layers laminated into the film 20 is not limited to three. The film 20 may include one layer, two layers, or four or more layers.

A sealing film 21 is interposed between the film 20 and the positive electrode lead 14, and a sealing film 22 is interposed between the film 20 and the negative electrode lead 15. The sealing films 21 and 22 are members for preventing outside air from entering. The sealing films 21 and 22 include, without limitation, one or more polyolefin resins having adherence to the positive electrode lead 14 and the negative electrode lead 15, respectively. Examples of the polyolefin resin include polyethylene, polypropylene, modified polyethylene, and modified polypropylene. Note that the sealing film 21, the sealing film 22, or both may be omitted.

As illustrated in FIGS. 5 and 6, the wound electrode body 10 includes the positive electrode 11, the negative electrode 12, a separator 13, and an electrolytic solution. The electrolytic solution is a liquid electrolyte. The wound electrode body 10 has a structure in which the positive electrode 11 and the negative electrode 12 are stacked on each other with the separator 13 interposed therebetween, and the stack of the positive electrode 11, the negative electrode 12, and the separator 13 is wound. The positive electrode 11, the negative electrode 12, and the separator 13 are each impregnated with the electrolytic solution.

As illustrated in FIG. 6, the positive electrode 11 includes a positive electrode current collector 11A, and two positive electrode active material layers 11B provided on respective sides of the positive electrode current collector 11A. However, the positive electrode active material layer 11B may be provided on only one side of the positive electrode current collector 11A.

The positive electrode current collector 11A includes one or more of electrically conductive materials including, without limitation, aluminum, nickel, and stainless steel.

The positive electrode active material layer 11B includes one or more of positive electrode active materials into which lithium is inserted and from which lithium is extracted. The positive electrode active material layer 11B may further include a material such as a positive electrode binder or a positive electrode conductor.

The positive electrode active material is not limited to a particular kind, and is a lithium-containing compound such as a lithium-containing transition metal compound. The lithium-containing transition metal compound includes lithium and one or more of transition metal elements, and may further include one or more of other elements. The other elements may be any elements other than a transition metal element, and are not limited to particular kinds. In particular, the other elements are preferably those belonging to Groups 2 to 15 in the long period periodic table. Note that the lithium-containing transition metal compound may be an oxide, or may be, for example, one of a phosphoric acid compound, a silicic acid compound, and a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The positive electrode conductor may be a material such as a metal material or an electrically conductive polymer as long as the material has an electrically conductive property.

The positive electrode active material layer 11B is provided on a portion of the positive electrode current collector 11A on both sides of the positive electrode current collector 11A. Accordingly, a portion of the positive electrode current collector 11A on which the positive electrode active material layer 11B is not provided is exposed without being covered with the positive electrode active material layer 11B.

Specifically, the positive electrode current collector 11A extends in a longitudinal direction (X-axis direction) as illustrated in FIG. 7, and includes a covered portion 11AX and paired uncovered portions 11AY. The covered portion 11AX is a portion which are located at the middle portion of the positive electrode current collector 11A in the longitudinal direction and on which the positive electrode active material layer 11B is formed. The paired uncovered portions 11AY are portions which are located at respective ends of the positive electrode current collector 11A in the longitudinal direction and on which the positive electrode active material layer 11B is not formed. Accordingly, the covered portion 11AX is covered with the positive electrode active material layer 11B, whereas the paired uncovered portions 11AY are exposed without being covered with the positive electrode active material layer 11B. In FIG. 7, the positive electrode active material layer 11B is slightly shaded.

As illustrated in FIG. 6, the negative electrode 12 includes a negative electrode current collector 12A, and two negative electrode active material layers 12B provided on respective sides of the negative electrode current collector 12A. However, the negative electrode active material layer 12B may be provided only on one side of the negative electrode current collector 12A.

The negative electrode current collector 12A includes one or more of electrically conductive materials including, without limitation, copper, aluminum, nickel, and stainless steel.

The negative electrode active material layer 12B includes one or more of negative electrode active materials into which lithium is inserted and from which lithium is extracted. The negative electrode active material layer 12B may further include a material such as a negative electrode binder or a negative electrode conductor. Details of each of the negative electrode binder and the negative electrode conductor are similar to details of each of the positive electrode binder and the positive electrode conductor described above.

The negative electrode active material has a configuration similar to that of the active material 100 described above. However, the negative electrode active material may further include one or more other materials. Examples of the other materials include a carbon material and a metal-based material. Examples of the carbon material include graphitizable carbon, non-graphitizable carbon, and graphite. The metal-based material is a metal element or a metalloid element that is able to form an alloy with lithium. More specifically, the metal-based material is, for example, silicon or tin. The metal-based material may be a simple substance, an alloy, a compound, or a mixture of two or more thereof. The carbon-reduced silicate glass described above is excluded from the examples of the metal-based material described here.

Specific examples of the metal-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$ or $0.2<v<1.4$), $LiSiO$, $SnO_w$ ($0<w\leq2$), $SnSiO_3$, $LiSnO$, and $Mg_2Sn$.

A method of forming the negative electrode active material layer 12B is not limited to a particular method, and includes one or more of methods including, without limitation, a coating method, a vapor-phase method, a liquid-phase method, a thermal spraying method, and a firing (sintering) method.

The negative electrode active material layer 12B is provided on the entire negative electrode current collector 12A on both sides of the negative electrode current collector 12A. Accordingly, the negative electrode current collector 12A is entirely covered with the negative electrode active material layer 12B without being exposed.

Specifically, as illustrated in FIG. 7, the negative electrode current collector 12A extends in the longitudinal direction (X-axis direction), and the negative electrode active material layer 12B includes paired non-opposed portions 12BZ. The paired non-opposed portions 12BZ are opposed to the paired uncovered portions 11AY. That is, the paired non-opposed portions 12BZ are not opposed to the positive electrode active material layer 11B and thus do not contribute to charging and discharging reactions. In FIG. 7, the negative electrode active material layer 12B is darkly shaded.

The negative electrode active material layer 12B is entirely provided on each of both sides of the negative electrode current collector 12A, whereas the positive electrode active material layer 11B is provided on only a portion (the covered portion 11AX) of each of both sides of the positive electrode current collector 11A, in order to prevent lithium extracted from the positive electrode active material layer 11B at the time of charging from precipitating on the surface of the negative electrode 12.

In a case of examining whether the two physical property conditions relating to XPS and Raman spectroscopy described above are satisfied ex post facto, i.e., after the completion of the secondary battery or during use of the secondary battery, it is preferable to use the non-opposed portions 12BZ as the negative electrode active material layer 12B for collecting the negative electrode active material for analysis. A reason for this is that the non-opposed portions 12BZ hardly contribute to the charging and discharging reactions, and the state (e.g., the composition and the physical property) of the negative electrode active material (carbon-reduced silicate glass) is thus easily maintained as the state at the time of forming the negative electrode 12 without being influenced by the charging and discharging reactions. Accordingly, it is possible to examine whether the two physical property conditions are satisfied in a highly stable and reproducible manner even in a case where the secondary battery has been used.

As illustrated in FIG. 6, the separator 13 is interposed between the positive electrode 11 and the negative electrode 12. The separator 13 is an insulating porous film that allows lithium to pass therethrough while preventing contact (short circuiting) between the positive electrode 11 and the negative electrode 12. The separator 13 may be a single-layer film including one porous film, or may be a multi-layer film including two or more porous films that are stacked on each other. The porous film includes one or more of polymer compounds including, without limitation, polytetrafluoroethylene, polypropylene, and polyethylene.

The electrolytic solution includes a solvent and an electrolyte salt. Only one solvent may be used, or two or more solvents may be used. In addition, only one electrolyte salt may be used, or two or more electrolyte salts may be used.

The solvent includes a non-aqueous solvent (an organic solvent), and the electrolytic solution including the non-aqueous solvent is a so-called non-aqueous electrolytic solution.

Examples of the non-aqueous solvent include esters and ethers. More specifically, examples of the non-aqueous solvent include a carbonic-acid-ester-based compound, a carboxylic-ester-based compound, and a lactone-based compound.

Examples of the carbonic-acid-ester-based compound include a cyclic carbonic acid ester and a chain carbonic acid ester. Examples of the cyclic carbonic acid ester include ethylene carbonate and propylene carbonate. Examples of the chain carbonic acid ester include dimethyl carbonate, diethyl carbonate, and methyl ethyl carbonate. Examples of the carboxylic-ester-based compound include ethyl acetate, ethyl propionate, and ethyl trimethylacetate. Examples of the lactone-based compound include γ-butyrolactone and γ-valerolactone. Examples of the ethers other than the lactone-based compounds described above include 1,2-dimethoxyethane, tetrahydrofuran, 1,3-dioxolane, and 1,4-dioxane.

Examples of the non-aqueous solvent further include an unsaturated cyclic carbonic acid ester, a halogenated carbonic acid ester, a sulfonic acid ester, a phosphoric acid ester, an acid anhydride, a nitrile compound, and an isocyanate compound. A reason for this is that chemical stability of the electrolytic solution improves.

Specific examples of the unsaturated cyclic carbonic acid ester include vinylene carbonate, vinylethylene carbonate, and methylene ethylene carbonate. Examples of the halogenated carbonic acid ester include fluoroethylene carbonate and difluoroethylene carbonate. Examples of the sulfonic acid ester include 1,3-propane sultone. Examples of the phosphoric acid ester include trimethyl phosphate. Examples of the acid anhydride include a cyclic carboxylic acid anhydride, a cyclic disulfonic acid anhydride, and a cyclic carboxylic acid sulfonic acid anhydride. Examples of the cyclic carboxylic acid anhydride include succinic anhydride, glutaric anhydride, and maleic anhydride. Examples of the cyclic disulfonic acid anhydride include ethane disulfonic anhydride and propane disulfonic anhydride. Examples of the cyclic carboxylic acid sulfonic acid anhydride include sulfobenzoic anhydride, sulfopropionic anhydride, and sulfobutyric anhydride. Examples of the nitrile compound include acetonitrile and succinonitrile. Examples of the isocyanate compound include hexamethylene diisocyanate.

The electrolyte salt includes one or more of light metal salts including, without limitation, a lithium salt. Examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide ($LiN(CF_3SO_2)_2$), lithium tris(trifluoromethanesulfonyl)methide ($LiC(CF_3SO_2)_3$), and lithium bis(oxalato)borate ($LiB(C_2O_4)_2$). The content of the electrolyte salt is not limited to a particular content; however, the content is from 0.3 mol/kg to 3.0 mol/kg both inclusive with respect to the solvent. A reason for this is that high ion conductivity is obtainable.

The positive electrode lead 14 is coupled to the positive electrode 11 (the positive electrode current collector 11A), and the negative electrode lead 15 is coupled to the negative electrode 12 (the negative electrode current collector 12A). The positive electrode lead 14 and the negative electrode lead 15 are each extracted from inside the film 20 to outside in a similar direction. The positive electrode lead 14 includes one or more of electrically conductive materials including, without limitation, aluminum, and the negative electrode lead 15 includes one or more of electrically conductive materials including, without limitation, copper, nickel, and stainless steel. The positive electrode lead 14 and the negative electrode lead 15 each have a shape such as a thin plate shape or a meshed shape.

The secondary battery operates as follows. Upon charging the secondary battery, lithium is extracted from the positive electrode 11, and the extracted lithium is inserted into the negative electrode 12 via the electrolytic solution. In contrast, upon discharging the secondary battery, lithium is extracted from the negative electrode 12, and the extracted lithium is inserted into the positive electrode 11 via the electrolytic solution. Upon charging and discharging the secondary battery, lithium is inserted and extracted in an ionic state.

In a case of manufacturing the secondary battery, the positive electrode 11 and the negative electrode 12 are fabricated and the electrolytic solution is prepared, following which the secondary battery is assembled according to a procedure described below.

First, the positive electrode active material is mixed with, on an as-needed basis, a material such as the positive electrode binder or the positive electrode conductor to thereby obtain a positive electrode mixture. Thereafter, the positive electrode mixture is put into a solvent such as an organic solvent to thereby prepare a positive electrode mixture slurry in a paste state. Lastly, the positive electrode mixture slurry is applied on each of both sides of the positive electrode current collector 11A to thereby form the positive electrode active material layer 11B. Thereafter, the positive electrode active material layer 11B may be compression-molded using a roll pressing machine. In this case, the positive electrode active material layer 11B may be heated. The positive electrode active material layer 11B may be compression-molded multiple times. The positive electrode active material layer 11B is thus formed on each of both sides of the positive electrode current collector 11A. As a result, the positive electrode 11 is fabricated.

The negative electrode active material layer 12B is formed on each of both sides of the negative electrode current collector 12A by a procedure similar to the fabrication procedure of the positive electrode 11 described above. Specifically, the negative electrode active material is mixed with, on an as-needed basis, a material such as the negative electrode binder or the negative electrode conductor to thereby obtain a negative electrode mixture. Thereafter, the negative electrode mixture is put into a solvent such as an organic solvent to thereby prepare a negative electrode mixture slurry in a paste state. Thereafter, the negative electrode mixture slurry is applied on each of both sides of the negative electrode current collector 12A to thereby form the negative electrode active material layer 12B. Thereafter, the negative electrode active material layer 12B may be compression-molded. The negative electrode active material layer 12B is thus formed on each of both sides of the negative electrode current collector 12A. As a result, the negative electrode 12 is fabricated.

The electrolyte salt is put into the solvent such as an organic solvent. This allows the electrolyte salt to be dispersed or dissolved into the solvent. As a result, the electrolytic solution is prepared.

First, the positive electrode lead 14 is coupled to the positive electrode 11 (the positive electrode current collector 11A) by a method such as a welding method, and the negative electrode lead 15 is coupled to the negative electrode 12 (the negative electrode current collector 12A) by a method such as a welding method. Thereafter, the positive electrode 11 and the negative electrode 12 are stacked on each other with the separator 13 interposed therebetween, following which the stack of the positive electrode 11, the negative electrode 12, and the separator 13 is wound to thereby fabricate a wound body. Thereafter, the wound body is contained inside the depression 20U and the film 20 is folded, following which outer edges of two sides of the film 20 (the fusion-bonding layer) are bonded to each other by a method such as a thermal fusion bonding method. Thus, the wound body is placed into the film 20 having the pouch shape. Lastly, the electrolytic solution is injected into the film 20 having the pouch shape, following which the outer edges of the remaining one side of the film 20 (the fusion-bonding layer) are bonded with each other using a method such as a thermal fusion bonding method. In this case, the sealing film 21 is disposed between the film 20 and the positive electrode lead 14, and the sealing film 22 is disposed between the film 20 and the negative electrode lead 15. The wound body is thereby impregnated with the electrolytic solution. Thus, the wound electrode body 10 is fabricated. Accordingly, the wound electrode body 10 is sealed in the film 20 having the pouch shape. As a result, the secondary battery of the laminated-film type is completed.

According to the secondary battery of the laminated-film type, the negative electrode active material included in the negative electrode 12 has a configuration similar to that of the active material 100. This makes it easy for lithium to be sufficiently and stably inserted into or extracted from the negative electrode active material, and also continuously makes it easy for lithium to be inserted into or extracted from the negative electrode active material even if the charging and discharging reactions are repeated, for a reason similar to that described above in relation to the active material 100. It is therefore possible to obtain a superior battery characteristic.

Other action and effects of the secondary battery of the laminated-film type and the manufacturing method thereof are similar to the other action and effects of the active material 100 and the manufacturing method thereof.

Next, a description is given of the secondary battery of a cylindrical type including a battery can 41 with stiffness as an outer package member for containing a battery device inside.

Figure 8:
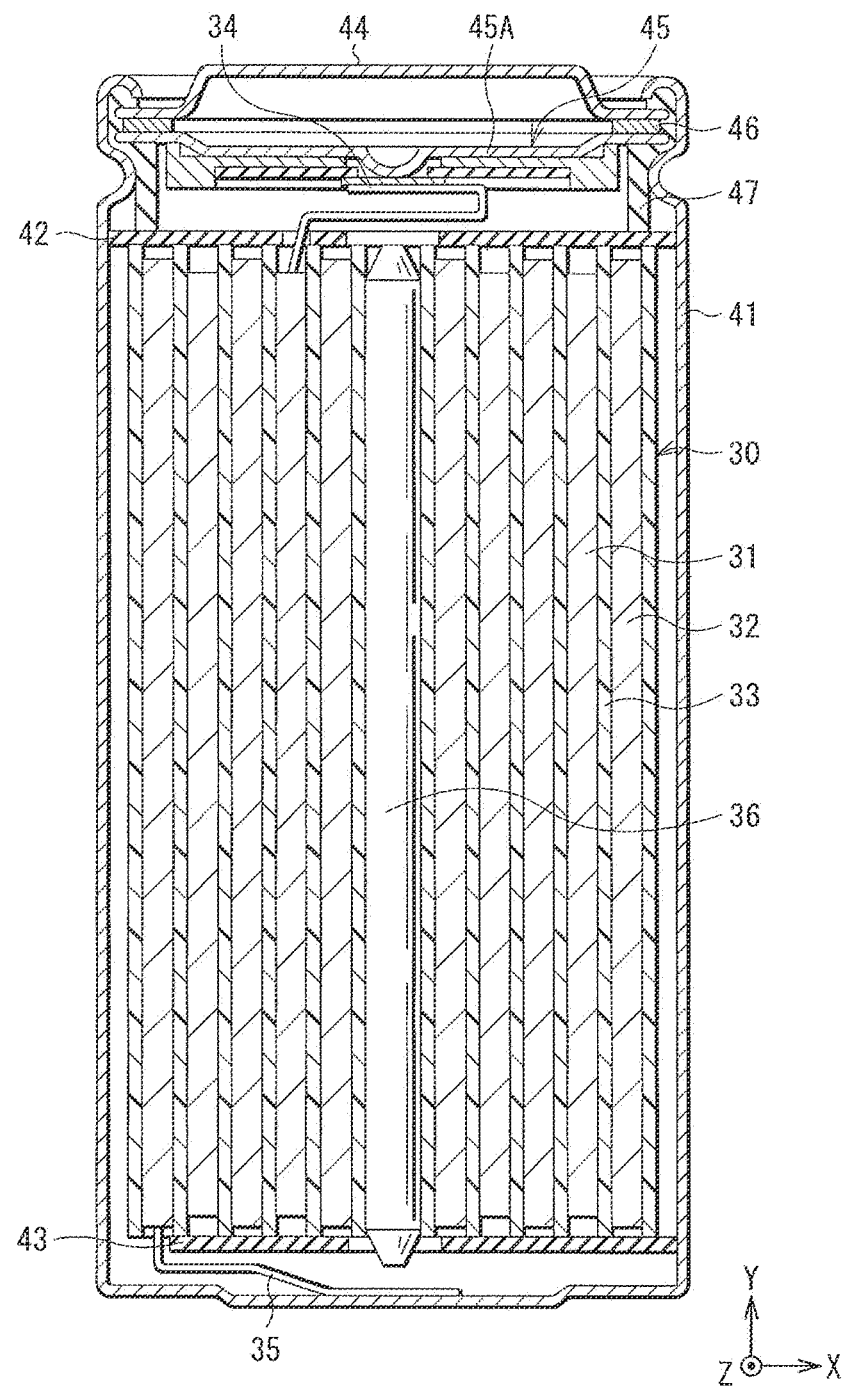
FIG. 8 is a sectional view of configurations of another electrode and another secondary battery of a cylindrical type according to one embodiment of the technology.

FIG. 8 illustrates a sectional configuration of the secondary battery of the cylindrical type. In the following description, reference will be made as necessary to the components of the secondary battery of the laminated-film type, which have been already described above, and FIG. 6.

As illustrated in FIG. 8, the secondary battery includes a pair of insulating plates 42 and 43 and a battery device of a wound type (a wound electrode body 30) that are provided inside the battery can 41 having a cylindrical shape. A positive electrode lead 34 and a negative electrode lead 35 are coupled to the wound electrode body 30.

The battery can 41 has a hollow structure with a closed end and an open end, and includes one or more of metal materials including, without limitation, iron, aluminum, and an alloy thereof. The battery can 41 has a surface that may be plated with, for example, a metal material such as nickel. The insulating plates 42 and 43 are disposed in such a manner as to sandwich the wound electrode body 30 therebetween, and extend in a direction intersecting a wound peripheral surface of the wound electrode body 30.

A battery cover 44, a safety valve mechanism 45, and a positive temperature coefficient device (PTC device) 46 are crimped at the open end of the battery can 41 by means of a gasket 47 having an insulating property, thereby sealing the open end of the battery can 41. The battery cover 44 includes a material similar to a material included in the battery can 41. The safety valve mechanism 45 and the PTC device 46 are each disposed on an inner side of the battery cover 44. The safety valve mechanism 45 is electrically coupled to the battery cover 44 via the PTC device 46. When an internal pressure of the battery can 41 reaches a certain level or higher as a result of causes including, without limitation, internal short circuiting and heating from outside, a disk plate 45A inverts, thereby cutting off the electrical coupling between the battery cover 44 and the wound electrode body 30. The PTC device 46 involves an increase in resistance in accordance with a rise in temperature, in order to prevent abnormal heat generation resulting from a large current. The gasket 47 may have a surface on which a material such as asphalt is applied, for example.

The wound electrode body 30 includes a positive electrode 31, a negative electrode 32, a separator 33, and an electrolytic solution. The wound electrode body 30 has a structure in which the positive electrode 31 and the negative electrode 32 are stacked on each other with the separator 33 interposed therebetween, and the stack of the positive electrode 31, the negative electrode 32, and the separator 33 is wound. The positive electrode 31, the negative electrode 32, and the separator 33 are each impregnated with the electrolytic solution. The positive electrode lead 34 is coupled to the positive electrode 31 (a positive electrode current collector 31A), and the negative electrode lead 35 is coupled to the negative electrode 32 (a negative electrode current collector 32A).

A center pin 36 is disposed in a space provided at the winding center of the wound electrode body 30. Note, however, that the center pin 36 may be omitted. The positive electrode lead 34 includes one or more of electrically conductive materials including, without limitation, aluminum. The positive electrode lead 34 is electrically coupled to the battery cover 44 via the safety valve mechanism 45. The negative electrode lead 35 includes one or more of electrically conductive materials including, without limitation, copper, nickel, and stainless steel (SUS). The negative electrode lead 35 is electrically coupled to the battery can 41. The positive electrode lead 34 and the negative electrode lead 35 each have a shape such as a thin plate shape or a meshed shape.

As illustrated in FIG. 6, the positive electrode 31 includes the positive electrode current collector 31A and a positive electrode active material layer 31B, and the negative electrode 32 includes the negative electrode current collector 32A and a negative electrode active material layer 32B. The positive electrode current collector 31A, the positive electrode active material layer 31B, the negative electrode current collector 32A, and the negative electrode active material layer 32B have configurations similar to the configurations of the positive electrode current collector 11A, the positive electrode active material layer 11B, the negative electrode current collector 12A, and the negative electrode active material layer 12B, respectively. The separator 33 has a configuration similar to the configuration of the separator 13.

The secondary battery operates as follows. Upon charging the secondary battery, lithium is extracted from the positive electrode 31, and the extracted lithium is inserted into the negative electrode 32 via the electrolytic solution. In contrast, upon discharging the secondary battery, lithium is extracted from the negative electrode 32, and the extracted lithium is inserted into the positive electrode 31 via the electrolytic solution. Upon charging and discharging the secondary battery, lithium is inserted and extracted in an ionic state.

In a case of manufacturing the secondary battery, the positive electrode 31 and the negative electrode 32 are fabricated, following which the secondary battery is assembled according to a procedure described below. Note that the description of the procedure for preparing the electrolytic solution, which has been already given above, is omitted here.

The positive electrode 31 is fabricated through a procedure similar to the procedure for fabricating the positive electrode 11, and the negative electrode 32 is fabricated through a procedure similar to the procedure for fabricating the negative electrode 12. That is, in a case of fabricating the positive electrode 31, the positive electrode active material layer 31B is formed on each of both sides of the positive electrode current collector 31A. In a case of fabricating the negative electrode 32, the negative electrode active material layer 32B is formed on each of both sides of the negative electrode current collector 32A.

First, the positive electrode lead 34 is coupled to the positive electrode 31 (the positive electrode current collector 31A) by a method such as a welding method, and the negative electrode lead 35 is coupled to the negative electrode 32 (the negative electrode current collector 32A) by a method such as welding method. Thereafter, the positive electrode 31 and the negative electrode 32 are stacked on each other with the separator 33 interposed therebetween, following which the stack of the positive electrode 31, the negative electrode 32, and the separator 33 is wound to thereby fabricate a wound body. Thereafter, the center pin 36 is disposed in the space provided at the winding center of the wound body.

Thereafter, the wound body is interposed between the pair of insulating plates 42 and 43, and the wound body in that state is contained in the battery can 41 together with the insulating plates 42 and 43. In this case, the positive electrode lead 34 is coupled to the safety valve mechanism 45 by a method such as a welding method, and the negative electrode lead 35 is coupled to the battery can 41 by a method such as a welding method. Thereafter, the electrolytic solution is injected into the battery can 41 to thereby impregnate each of the positive electrode 31, the negative electrode 32, and the separator 33 with the electrolytic solution. As a result, the wound electrode body 30 is fabricated.

Lastly, the open end of the battery can 41 is crimped by means of the gasket 47 to thereby attach the battery cover 44, the safety valve mechanism 45, and the PTC device 46 to the open end of the battery can 41. Thus, the wound electrode body 30 is sealed in the battery can 41. As a result, the secondary battery of the cylindrical type is completed.

According to the secondary battery of the cylindrical type, the negative electrode active material included in the negative electrode 32 has a configuration similar to that of the active material 100. This makes it possible for the secondary battery of the cylindrical type to provide a superior battery characteristic for a reason similar to that described above in relation to the secondary battery of the laminated-film type.

Other action and effects of the secondary battery of the cylindrical type are similar to the other action and effects of the secondary battery of the laminated-film type.

Next, a description is given of modifications of the active material and the secondary battery described above. The configuration of each of the active material and the secondary battery may be changed as appropriate as described below. However, any two or more of the modifications described in sequence below may be combined to each other.
[Modification 1]
The active material 100 illustrated in FIG. 1 includes the center part 101 and the covering part 102. However, the active material 100 may include only the center part 101 and may not include the covering part 102. In this case, the covering part 102 may be removed after the active material 100 including the center part 101 and the covering part 102 is manufactured. Similar effects are obtainable also in this case as the electrode reactant is insertable into and extractable from the active material 100 (the center part 101).

However, to improve the electrically conductive property of the active material 100 as a whole, the active material 100 preferably includes both the center part 101 and the covering part 102 as described above.
[Modification 2]
The battery device of the wound type (the wound electrode body 10) is used in FIGS. 5 and 6. However, a battery device of a stacked type (a stacked electrode body 50) may be used instead of the wound electrode body 10, as illustrated in FIG. 9 corresponding to FIG. 5, and FIG. 10 corresponding to FIG. 6.

Figure 9:
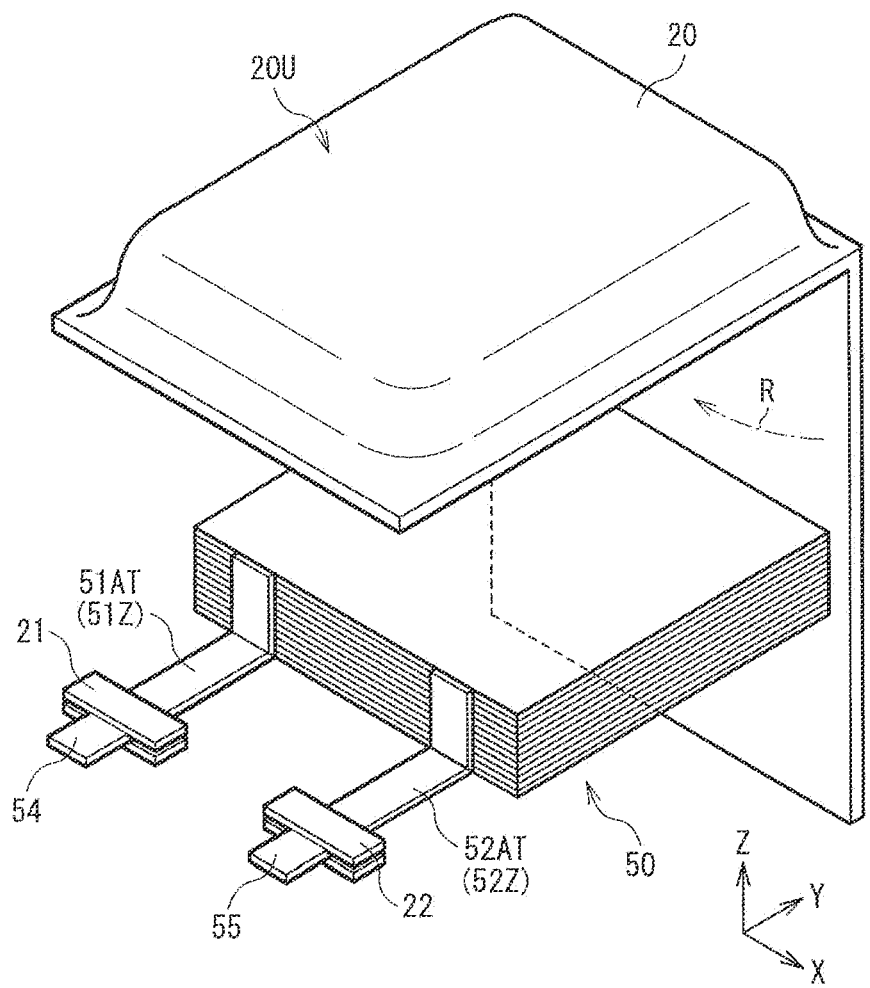
FIG. 9 is a perspective view of a configuration of a secondary battery of another laminated-film type according to Modification 2.
Figure 10:
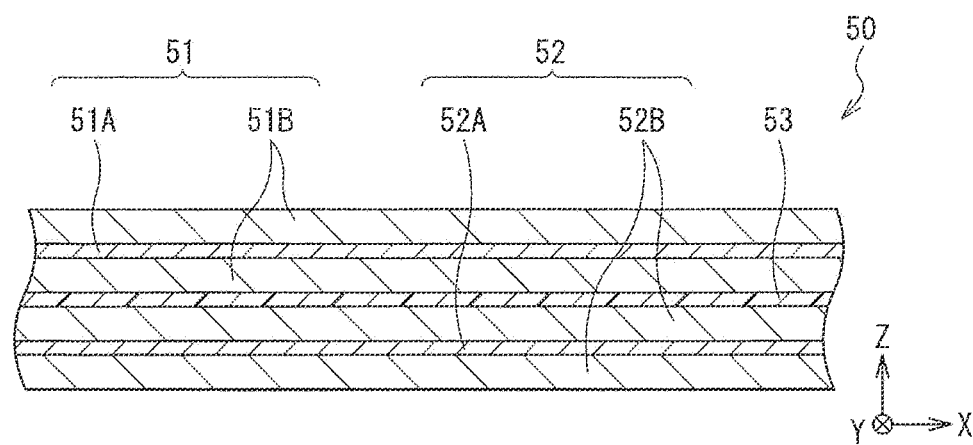
FIG. 10 is a sectional view of a configuration of a stacked electrode body illustrated in FIG. 9.

The secondary battery of the laminated-film type illustrated in FIGS. 9 and 10 has a configuration similar to that of the secondary battery of the laminated-film type illustrated in FIGS. 5 and 6 except that the stacked electrode body 50 (the positive electrode 51, the negative electrode 52, and the separator 53), the positive electrode lead 54, and the negative electrode lead 55 are included instead of the wound electrode body 10 (the positive electrode 11, the negative electrode 12, and the separator 13), the positive electrode lead 14, and the negative electrode lead 15.

The positive electrode 51, the negative electrode 52, the separator 53, the positive electrode lead 54, and the negative electrode lead 55 have configurations similar to the configurations of the positive electrode 11, the negative electrode 12, the separator 13, the positive electrode lead 14, and the negative electrode lead 15, respectively, except the following points.

In the stacked electrode body 50, the positive electrode 51 and the negative electrode 52 are alternately stacked on each other with the separator 53 interposed therebetween. The number of the positive electrodes 51, the negative electrodes 52, and the separators 53 to be stacked are not limited to a particular number. Here, the multiple positive electrodes 51 and the multiple negative electrodes 52 are alternately stacked on each other with the multiple separators 53 interposed therebetween. The positive electrodes 51, the negative electrodes 52, and the separators 53 are each impregnated with the electrolytic solution having the configuration described above. The positive electrode 51 includes a positive electrode current collector 51A and a positive electrode active material layer 51B. The negative electrode 52 includes a negative electrode current collector 52A and a negative electrode active material layer 52B.

As illustrated in FIGS. 9 and 10, the positive electrode current collector 51A includes a projecting part 51AT on which the positive electrode active material layer 51B is not formed, and the negative electrode current collector 52A includes a projecting part 52AT on which the negative electrode active material layer 52B is not formed. The projecting part 52AT is disposed at a position not overlapping the projecting part 51AT. Two or more projecting parts 51AT are joined to each other to form a single joint part 51Z having a lead shape. The two or more projecting parts 52AT are joined to each other to form a single joint part 52Z having a lead shape. The positive electrode lead 54 is coupled to the joint part 51Z, and the negative electrode lead 55 is coupled to the joint part 52Z.

A manufacturing method of the secondary battery of the laminated-film type illustrated in FIGS. 9 and 10 is similar to the manufacturing method of the secondary battery of the laminated-film type illustrated in FIGS. 5 and 6 except that the stacked electrode body 50 (the positive electrode lead 54 and the negative electrode lead 55) is fabricated instead of the wound electrode body 10 (the positive electrode lead 14 and the negative electrode lead 15).

In a case of fabricating the stacked electrode body 50, first, the positive electrode 51 including the positive electrode active material layer 51B formed on each of both sides of the positive electrode current collector 51A (except the projecting part 51AT) and the negative electrode 52 including the negative electrode active material layer 52B formed on each of both sides of the negative electrode current collector 52A (except the projecting part 52AT) are fabricated, following which the multiple positive electrodes 51 and the multiple negative electrodes 52 are alternately stacked on each other with the plurality of separators 53 interposed therebetween to thereby form a stacked body. Thereafter, the two or more projecting parts 51AT are joined to each other by a method such as a welding method to form the joint part 51Z, and the two or more projecting parts 52AT are joined to each other by a method such as a welding method to form the joint part 52Z. Thereafter, the positive electrode lead 54 is coupled to the projecting part 51AT by a method such as a welding method, and the negative electrode lead 55 is coupled to the projecting part 52AT by a method such as a welding method. Lastly, the electrolytic solution is injected into the film 20 having the pouch shape in which the stacked body is contained, following which the film 20 is sealed. Thus, the stacked body is impregnated with the electrolytic solution. As a result, the stacked electrode body 50 is fabricated.

In a case where the stacked electrode body 50 is used, it is also possible to obtain effects similar to the effects obtained in a case where the wound electrode body 10 is used. Although not specifically illustrated here, the battery device of the stacked type (the stacked electrode body 50) may be applied to the secondary battery of the cylindrical type illustrated in FIGS. 6 and 8.
[Modification 3]
The number of the positive electrode leads 54 and the number of the negative electrode leads 55 in the secondary battery of the laminated-film type illustrated in FIGS. 9 and 10 are each not limited to a particular number. That is, the number of the positive electrode leads 54 is not limited to one and may be two or greater. The number of the negative electrode lead 55 is not limited to one and may be two or greater. Similar effects are obtainable also in the case where the number of the positive electrode leads 54 and the number of the negative electrode leads 55 are changed. Although not specifically illustrated here, the number of the positive electrode leads 34 and the number of the negative electrode leads 35 may be changed in the secondary battery of the cylindrical type illustrated in FIGS. 6 and 8.
[Modification 4]
The separator 13 which is a porous film is used in the secondary battery of the laminated-film type illustrated in FIGS. 5 and 6. However, although not specifically illustrated here, a separator of a stacked type which includes a polymer compound layer may be used instead of the separator 13 which is the porous film.

Specifically, the separator of the stacked type includes a base layer which is the porous film described above, and a polymer compound layer provided on one or both sides of the base layer. A reason for this is that adherence of the separator to each of the positive electrode 11 and the negative electrode 12 is improved, which helps to prevent occurrence of a positional displacement of the wound electrode body 10. This helps to prevent swelling of the secondary battery, for example, even when the decomposition reaction of the electrolytic solution occurs. The polymer compound layer includes a polymer compound such as polyvinylidene difluoride. A reason for this is that polyvinylidene difluoride has a high physical strength and is electrochemically stable.

The base layer, the polymer compound layer, or both may include one or more of a plurality of kinds of particles including, without limitation, inorganic particles and resin particles. A reason for this is that materials, for example, the particles dissipate heat when the secondary battery generates heat, thereby improving the thermal resistance and safety of the secondary battery. The inorganic particles are not limited to a particular kind. Examples of the inorganic particles include particles of aluminum oxide (alumina), aluminum nitride, boehmite, silicon oxide (silica), titanium oxide (titania), magnesium oxide (magnesia), and zirconium oxide (zirconia).

In a case of fabricating the separator of the stacked type, a precursor solution including, without limitation, a polymer compound and an organic solvent is prepared, following which the precursor solution is applied on one or both sides of the base layer.

Similar effects are obtainable also in the case where the separator of the stacked type is used, as lithium is movable between the positive electrode 11 and the negative electrode 12. Note that the separator of the stacked type may be applied to the secondary battery of the cylindrical type illustrated in FIGS. 5 and 6.

[Modification 5]

In the secondary battery of the laminated-film type illustrated in FIGS. 5 and 6, the electrolytic solution, which is a liquid electrolyte, is used. However, although not specifically illustrated here, an electrolyte layer which is a gel electrolyte may be used instead of the electrolytic solution.

In the wound electrode body 10 including the electrolyte layer, the positive electrode 11 and the negative electrode 12 are stacked on each other with the separator 13 and the electrolyte layer interposed therebetween, following which the stack of the positive electrode 11, the negative electrode 12, the separator 13, and the electrolyte layer is wound. The electrolyte layer is interposed between the positive electrode 11 and the separator 13, and between the negative electrode 12 and the separator 13.

Specifically, the electrolyte layer includes a polymer compound together with the electrolytic solution. The electrolytic solution is held by the polymer compound in the electrolyte layer. The configuration of the electrolytic solution is as described above. The polymer compound includes, for example, polyvinylidene difluoride. In a case of forming the electrolyte layer, a precursor solution that includes materials including, without limitation, the electrolytic solution, the polymer compound, and an organic solvent is prepared, following which the precursor solution is applied on each of both sides of the positive electrode 11 and each of both sides of the negative electrode 12.

Similar effects are obtainable also in the case where the electrolyte layer is used, as lithium is movable between the positive electrode 11 and the negative electrode 12 via the electrolyte layer. Note that the electrolyte layer may be applied to the secondary battery of the cylindrical type illustrated in FIGS. 6 and 8.

Next, a description is given of applications (application examples) of the above-described secondary battery.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. Note that the secondary battery may have a battery structure of the above-described laminated-film type, a cylindrical type, or any other type. Further, multiple secondary batteries may be used, for example, as a battery pack or a battery module.

In particular, the battery pack and the battery module are each effectively applied to relatively large-sized equipment, etc., including an electric vehicle, an electric power storage system, and an electric power tool. The battery pack, as will be described later, may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

Some application examples of the secondary battery will now be described in detail. The configurations of the application examples described below are merely examples, and are appropriately modifiable. The secondary battery used in the following application examples is not limited to a particular type, and may be the laminated-film type or the cylindrical type.

Figure 11:
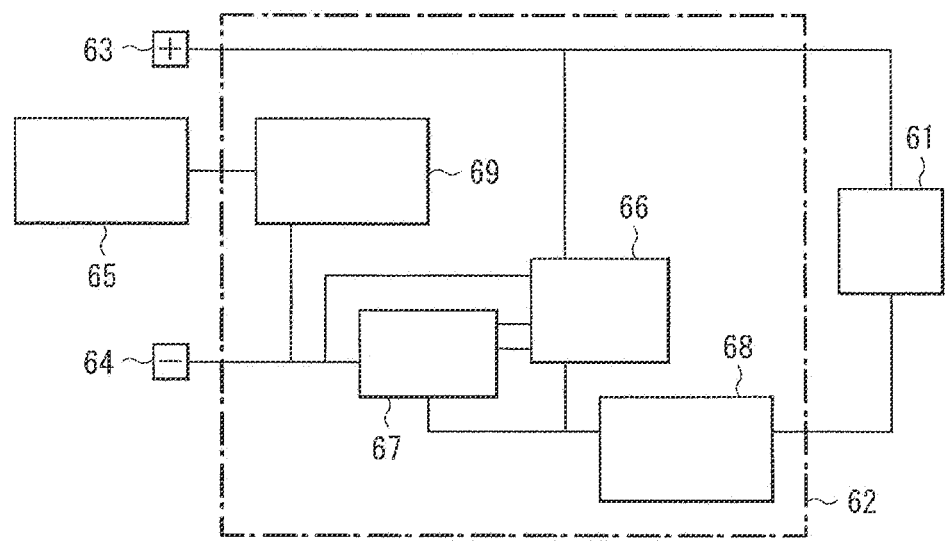
FIG. 11 is a block diagram illustrating a configuration of an application example of the secondary battery, which is a battery pack including a single battery.

FIG. 11 illustrates a block configuration of a battery pack including a single battery. The battery pack described here is a simple battery pack (a so-called soft pack) including one secondary battery, and is to be mounted on, for example, electronic equipment typified by a smartphone.

As illustrated in FIG. 11, the battery pack includes an electric power source 61 and a circuit board 62. The circuit board 62 is coupled to the electric power source 61, and includes a positive electrode terminal 63, a negative electrode terminal 64, and a temperature detection terminal (a so-called T terminal) 65.

The electric power source 61 includes one secondary battery. The secondary battery has a positive electrode lead coupled to the positive electrode terminal 63 and a negative electrode lead coupled to the negative electrode terminal 64. The electric power source 61 is couplable to outside via the positive electrode terminal 63 and the negative electrode terminal 64, and is thus chargeable and dischargeable via the positive electrode terminal 63 and the negative electrode terminal 64. The circuit board 62 includes a controller 66, a switch 67, a PTC device 68, and a temperature detector 69. However, the PTC device 68 may be omitted.

The controller 66 includes, for example, a central processing unit (CPU) and a memory, and controls an overall operation of the battery pack. The controller 66 detects and controls a use state of the electric power source 61 on an as-needed basis.

If a battery voltage of the electric power source 61 (the secondary battery) reaches an overcharge detection voltage or an overdischarge detection voltage, the controller 66 turns off the switch 67. This prevents a charging current from flowing into a current path of the electric power source 61. In addition, if a large current flows upon charging or discharging, the controller 66 turns off the switch 67 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 67 includes, for example, a charge control switch, a discharge control switch, a charging diode, and a discharging diode. The switch 67 performs switching between coupling and decoupling between the electric power source 61 and external equipment in accordance with an instruction from the controller 66. The switch 67 includes, for example, a metal-oxide-semiconductor field-effect transistor (MOSFET) including a metal-oxide semiconductor. The charging and discharging currents are detected on the basis of an ON-resistance of the switch 67.

The temperature detector 69 includes a temperature detection device such as a thermistor. The temperature detector 69 measures a temperature of the electric power source 61 using the temperature detection terminal 65, and outputs a result of the temperature measurement to the controller 66. The result of the temperature measurement to be obtained by the temperature detector 69 is used, for example, in a case where the controller 66 performs charge/discharge control upon abnormal heat generation or in a case where the controller 66 performs a correction process upon calculating a remaining capacity.

Figure 12:
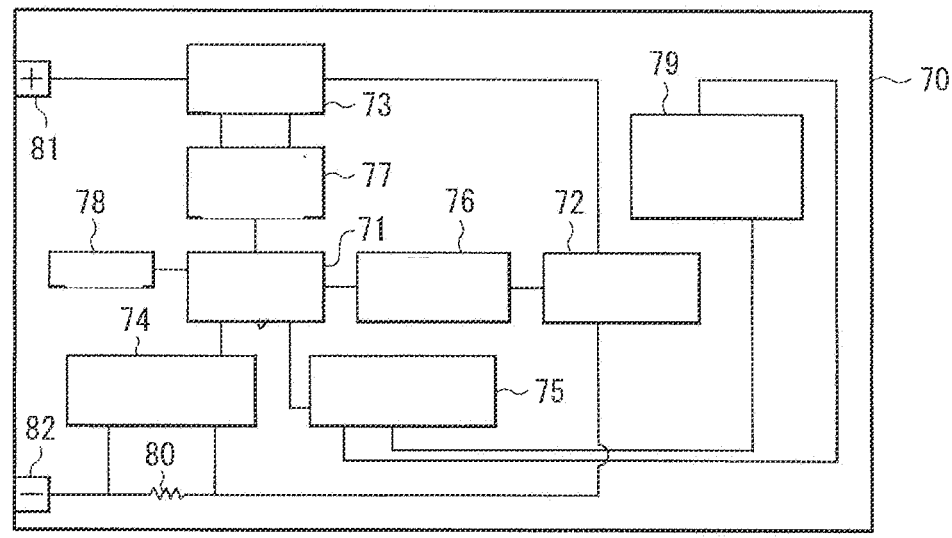
FIG. 12 is a block diagram illustrating a configuration of an application example of the secondary battery, which is a battery pack including an assembled battery.

FIG. 12 illustrates a block configuration of a battery pack including an assembled battery. In the following description, reference will be made as necessary to the components of the battery pack including the single battery (FIG. 11).

As illustrated in FIG. 12, the battery pack includes a positive electrode terminal 81 and a negative electrode terminal 82. Specifically, the battery pack includes, inside a housing 70, the following components: a controller 71, an electric power source 72, a switch 73, a current measurement unit 74, a temperature detector 75, a voltage detector 76, a switch controller 77, a memory 78, a temperature detection device 79, and a current detection resistor 80.

The electric power source 72 includes an assembled battery in which two or more secondary batteries are coupled to each other, and a type of the coupling of the two or more secondary batteries is not particularly limited. Accordingly, the coupling scheme may be in series, in parallel, or of a mixed type of both. For example, the electric power source 72 includes six secondary batteries coupled to each other in two parallel and three series.

Configurations of the controller 71, the switch 73, the temperature detector 75, and the temperature detection device 79 are similar to those of the controller 66, the switch 67, and the temperature detector 69 (the temperature detection device). The current measurement unit 74 measures a current using the current detection resistor 80, and outputs a result of the measurement of the current to the controller 71. The voltage detector 76 measures a battery voltage of the electric power source 72 (the secondary battery) and provides the controller 71 with a result of the measurement of the voltage that has been subjected to analog-to-digital conversion.

The switch controller 77 controls an operation of the switch 73 in response to signals supplied by the current measurement unit 74 and the voltage detector 76. If a battery voltage reaches an overcharge detection voltage or an overdischarge detection voltage, the switch controller 77 turns off the switch 73 (the charge control switch). This prevents a charging current from flowing into a current path of the electric power source 72. This enables the electric power source 72 to perform only discharging through the discharging diode, or only charging through the charging diode. In addition, if a large current flows upon charging or discharging, the switch controller 77 blocks the charging current or the discharging current.

The switch controller 77 may be omitted and the controller 71 may thus also serve as the switch controller 77. The overcharge detection voltage and the overdischarge detection voltage are not particularly limited, and are similar to those described above in relation to the battery pack including the single battery.

The memory 78 includes, for example, an electrically erasable programmable read-only memory (EEPROM) which is a non-volatile memory, and the memory 78 stores, for example, a numeric value calculated by the controller 71 and data (e.g., an initial internal resistance, a full charge capacity, and a remaining capacity) of the secondary battery measured in the manufacturing process.

The positive electrode terminal 81 and the negative electrode terminal 82 are terminals coupled to, for example, external equipment that operates using the battery pack, such as a laptop personal computer, or external equipment that is used to charge the battery pack, such as a charger. The electric power source 72 (the secondary battery) is chargeable and dischargeable through the positive electrode terminal 81 and the negative electrode terminal 82.

Figure 13:
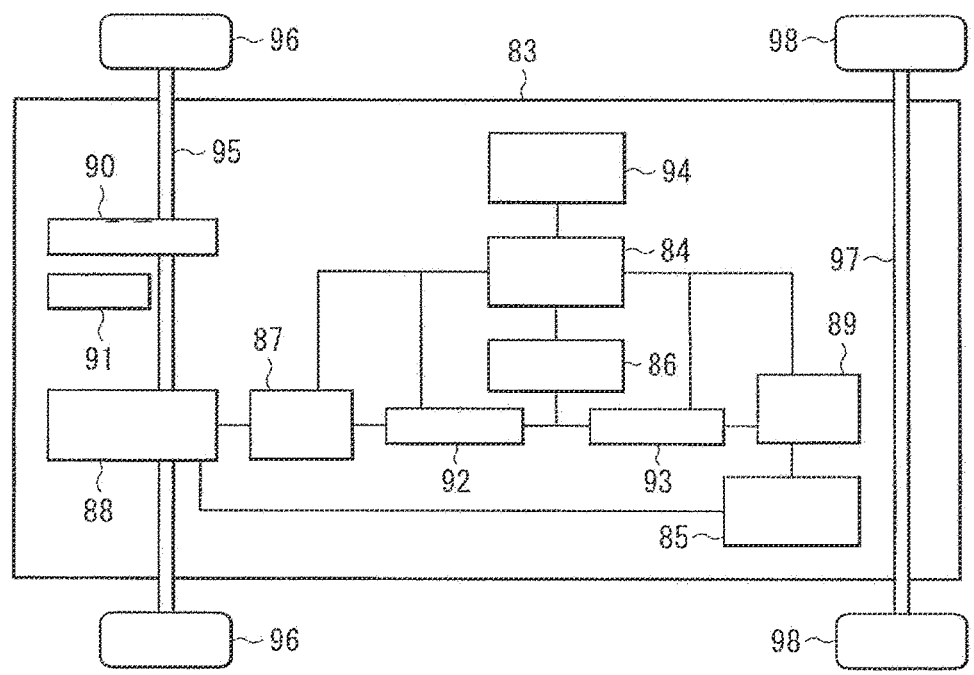
FIG. 13 is a block diagram illustrating a configuration of an application example of the secondary battery, which is an electric vehicle.

FIG. 13 illustrates a block configuration of a hybrid automobile which is an example of the electric vehicle. As illustrated in FIG. 13, the electric vehicle includes, inside a housing 83, the following components: a controller 84, an engine 85, an electric power source 86, a motor 87, a differential 88, an electric generator 89, a transmission 90, a clutch 91, inverters 92 and 93, and sensors 94. The electric vehicle also includes a front wheel drive shaft 95, a pair of front wheels 96, a rear wheel drive shaft 97, and a pair of rear wheels 98. The front wheel drive shaft 95 and the pair of front wheels 96 are coupled to the differential 88 and the transmission 90.

The electric vehicle is configured to travel by using one of the engine 85 and the motor 87 as a driving source. The engine 85 is a major power source, such as a gasoline engine. In a case where the engine 85 is used as a power source, a driving force (a rotational force) of the engine 85 is transmitted to the front wheels 96 and the rear wheels 98 via the differential 88, the transmission 90, and the clutch 91, which are driving parts. Note that the rotational force of the engine 85 is transmitted to the electric generator 89, and the electric generator 89 thus generates alternating-current power by utilizing the rotational force. In addition, the alternating-current power is converted into direct-current power via the inverter 93, and the direct-current power is thus accumulated in the electric power source 86. In contrast, in a case where the motor 87 which is a converter is used as a power source, electric power (direct-current power) supplied from the electric power source 86 is converted into alternating-current power via the inverter 92. Thus, the motor 87 is driven by utilizing the alternating-current power. A driving force (a rotational force) converted from the electric power by the motor 87 is transmitted to the front wheels 96 and the rear wheels 98 via the differential 88, the transmission 90, and the clutch 91, which are the driving parts.

When the electric vehicle is decelerated by means of a brake mechanism, a resistance force at the time of the deceleration is transmitted as a rotational force to the motor 87. Thus, the motor 87 may generate alternating-current power by utilizing the rotational force. The alternating-current power is converted into direct-current power via the inverter 92, and direct-current regenerative power is accumulated in the electric power source 86.

The controller 84 includes, for example, a CPU, and controls an overall operation of the electric vehicle. The electric power source 86 includes one or more secondary batteries and is coupled to an external electric power source. In this case, the electric power source 86 may be supplied with electric power from the external electric power source and thereby accumulate the electric power. The sensors 94 are used to control the number of revolutions of the engine 85 and to control an angle of a throttle valve (a throttle angle). The sensors 94 include one or more of sensors including, without limitation, a speed sensor, an acceleration sensor, and an engine speed sensor.

The case where the electric vehicle is a hybrid automobile has been described as an example; however, the electric vehicle may be a vehicle that operates using only the electric power source 86 and the motor 87 and not using the engine 85, such as an electric automobile.

Although not specifically illustrated here, other application examples are also conceivable as application examples of the secondary battery.

Specifically, the secondary battery is applicable to an electric power storage system. The electric power storage system includes, inside a building such as a residential house or a commercial building, the following components: a controller, an electric power source including one or more secondary batteries, a smart meter, and a power hub.

The electric power source is coupled to electric equipment such as a refrigerator installed inside the building, and is couplable to an electric vehicle such as a hybrid automobile stopped outside the building. Further, the electric power source is coupled, via the power hub, to a home power generator such as a solar power generator installed at the building, and is also coupled, via the smart meter and the power hub, to a centralized power system of an external power station such as a thermal power station.

Alternatively, the secondary battery is applicable to an electric power tool such as an electric drill or an electric saw. The electric power tool includes, inside a housing to which a movable part such as a drilling part or a saw blade part is attached, the following components: a controller, and an electric power source including one or more secondary batteries.

EXAMPLES

A description is given of Examples of the technology of the present disclosure according to an embodiment.

Experiment Examples 1 to 16

Figure 14:
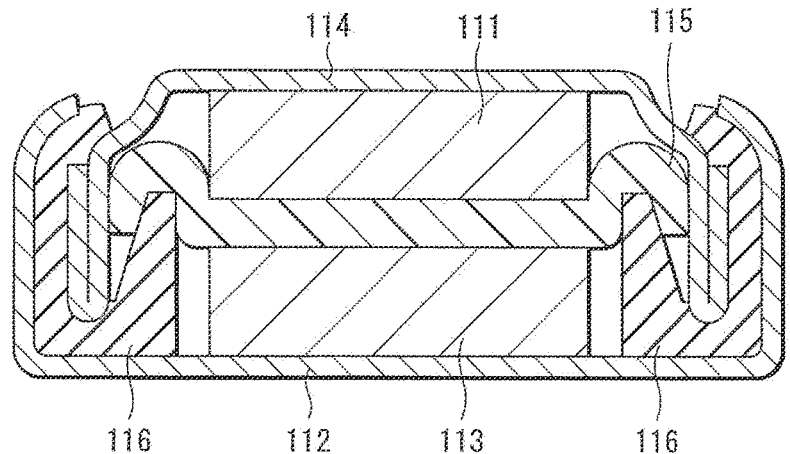
FIG. 14 is a sectional view of a configuration of a secondary battery of a coin type for testing.

FIG. 14 illustrates a sectional configuration of a secondary battery of a coin type for testing. In the following, a negative electrode active material was manufactured, following which the secondary battery of the coin type was fabricated using the negative electrode active material. Thereafter, a battery characteristic of the secondary battery was evaluated.

As illustrated in FIG. 14, the secondary battery of the coin type includes a test electrode 111 inside an outer package cup 114, and includes a counter electrode 113 inside an outer package can 112. The test electrode 111 and the counter electrode 113 are stacked on each other with the separator 115 interposed therebetween, and the outer package can 112 and the outer package cup 114 are crimped to each other by means of a gasket 116. The test electrode 111, the counter electrode 113, and the separator 115 are each impregnated with an electrolytic solution.

[Manufacture of Negative Electrode Active Material]

First, silicate glass was prepared as a raw material. The kinds of constituent elements (excluding oxygen and carbon) and the content (at %) of each of the constituent elements in carbon-reduced silicate glass synthesized with the silicate glass are as listed in Tables 1 and 2.

As described above, the content of each of the constituent elements is measured by analyzing the carbon-reduced silicate glass using SEM-EDX. In the analysis using the SEM-EDX, detection sensitivity to lithium is markedly low, and therefore the content of lithium is small enough to hardly affect the content of the second element. Thus, the content of lithium is not listed in Tables 1 and 2.

TABLE 1

| Experiment example | Si | B | P | Na | K | Sc | Ti | Zr | Ce | Al | S | Cl | Zn | Bi | Mg | Ca | Sr | Ba |
|---|---|---|---|---|---|---|---|---|---|---|---|---|---|---|---|---|---|---|
| | First element | | | Second element | | | | | | | | | | | Third element | | | |
| 1 | 98 | — | 1 | 1 | — | — | — | — | — | — | — | — | — | — | — | — | — | — |
| 2 | 72 | 15 | — | 1 | 4 | — | — | — | — | 7 | — | — | — | — | — | — | — | 1 |
| 3 | 55 | 10 | — | — | — | — | — | — | — | — | — | — | 3 | — | 20 | — | 12 | — |
| 4 | 80 | 15 | — | — | 3 | — | — | — | — | 2 | — | — | — | — | — | — | — | — |
| 5 | 60 | — | — | 1 | — | 1 | 1 | — | — | 5 | — | — | 1 | — | 2 | 4 | 10 | 15 |
| 6 | 60 | 5 | 1 | 3 | — | — | — | — | — | 3 | — | — | 3 | — | — | — | — | 25 |
| 7 | 60 | 5 | 1 | 1 | 3 | — | — | — | — | 20 | — | — | 10 | — | — | — | — | — |
| 8 | 65 | 10 | — | 1 | — | — | — | — | — | 1 | — | — | — | — | 10 | 7 | 2 | 4 |
| 9 | 70 | 25 | — | 1 | 2 | — | — | 1 | — | 1 | — | — | — | — | — | — | — | — |
| 10 | 15 | 20 | 1 | 2 | — | — | 4 | 6 | 1 | 5 | — | — | — | 45 | — | — | 1 | — |
| 11 | 37 | — | 1 | 10 | 22 | — | 30 | — | — | — | — | — | — | — | — | — | — | — |
| 12 | 32 | — | 2 | 25 | 13 | — | 16 | — | — | 2 | — | — | 1 | — | — | 7 | 2 | — |
| 13 | 75 | 2 | — | 6 | 5 | — | — | — | — | 4 | 1 | 1 | — | — | — | — | — | 6 |
| 16 | 100 | — | — | — | — | — | — | — | — | — | — | — | — | — | — | — | — | — |

TABLE 2

| Experiment example | Constituent element/Content (at %) | | | | XPS spectrum (Si2p) | | | | Raman spectrum | Charge capacity (mAh/g) | Discharge capacity (mAh/g) | Capacity retention rate (%) |
|---|---|---|---|---|---|---|---|---|---|---|---|---|
| | Si | First element | Second element | Third element | Apex (eV) | Shoulder | Half-width (eV) | S2/S1 | Apex ($cm^{-1}$) | | | |
| 1 | 98 | 1 | 1 | — | 103.2 | Observed | 4.0 | 0.97 | 457 | 1020 | 500 | 81 |
| 2 | 72 | 15 | 12 | 1 | 103.1 | Observed | 4.7 | 0.94 | 457 | 1219 | 620 | 90 |
| 3 | 55 | 10 | 3 | 32 | 102.5 | Not observed | 2.9 | 1.82 | 449 | 272 | 130 | 87 |
| 4 | 80 | 15 | 5 | — | 103.8 | Observed | 4.3 | 0.85 | 462 | 1271 | 640 | 91 |
| 5 | 60 | — | 9 | 31 | 102.3 | Not observed | 2.6 | 1.72 | 451 | 242 | 106 | 83 |
| 6 | 60 | 6 | 9 | 25 | 102.4 | Not observed | 2.9 | 1.52 | 450 | 224 | 103 | 86 |
| 7 | 60 | 6 | 34 | — | 103.2 | Observed | 4.3 | 0.97 | 455 | 1016 | 486 | 95 |
| 8 | 65 | 10 | 2 | 23 | 103.3 | Not observed | 2.7 | 0.71 | 450 | 281 | 82 | 78 |
| 9 | 70 | 25 | 5 | — | 103.5 | Observed | 4.8 | 0.88 | 450 | 1280 | 644 | 91 |
| 10 | 15 | 21 | 63 | 1 | 101.3 | Not observed | 3.8 | 1.69 | 442 | 418 | 201 | 21 |
| 11 | 37 | 1 | 62 | — | 102.9 | Not observed | 2.5 | 0.32 | 449 | 875 | 421 | 61 |
| 12 | 32 | 2 | 57 | 9 | 103.0 | Not observed | 4.3 | 0.46 | 445 | 482 | 238 | 84 |
| 13 | 75 | 2 | 17 | 6 | 102.9 | Observed | 5.2 | 1.55 | 454 | 1173 | 792 | 93 |
| 14 | 72 | 15 | 12 | 1 | 103.2 | Observed | 4.6 | 0.95 | 458 | 1262 | 610 | 89 |
| 15 | 72 | 15 | 12 | 1 | 103.1 | Observed | 4.7 | 0.94 | 457 | 1240 | 600 | 91 |
| 16 | 100 | — | — | — | 103.0 | Observed | 5.1 | 1.61 | 475 | 2240 | 1648 | 72 |

\* Carbon source: Carbon black (Experiment examples 1 to 13), Polyimide (Experiment example 14), Sucrose (Experiment example 15)

Thereafter, the silicate glass was mixed with a carbon source (carbon black, which is a carbon material) to thereby obtain a mixture. In this case, used as the carbon sources were carbon black (Experiment examples 1 to 13), which is a carbon material, and polyimide (Experiment example 14) and sucrose (Experiment example 15), which are carbonizable organic substances. In addition, the mixing ratio (weight ratio) of the silicate glass to the carbon source was 5:1.

Thereafter, a slurry was prepared by adding a binder solution (N-methyl-2-pyrrolidone solution of polyimide, solid content=18.6%) to the mixture and stirring the mixture at a (rotation speed of 2000 rpm for a stirring time of 3 minutes using a stirring device (rotating and revolving mixer, Awatori Rentaro, manufactured by THINKY Corporation). In this case, the amount of the binder solution added to the mixture was 10 weight percent (solid content ratio).

Thereafter, the slurry was dried in an oven at a temperature of 80° C. to obtain a dried product, following which the dried product was pulverized into pulverized flakes.

Thereafter, the pulverized flakes were put into an alumina boat, following which the pulverized flakes were heated at a heating temperature of 950° C. for a heating time of 10 hours in an argon atmosphere in a vacuum gas displacement furnace. In this case, the silicate glass was reduced in the presence of the carbon source (carbon reduction treatment) to synthesize the carbon-reduced silicate glass. As a result, a center part including the carbon-reduced silicate glass was formed. Further, a substance such as a decomposition product of the carbon source (organic substance decomposition carbon) was deposited on the surface of the center part, forming a covering part. Thus, a negative electrode active material in a flake state was obtained which included the center part and the covering part.

Lastly, the negative electrode active material in the flake state was pulverized in a mortar into the negative electrode active material in a powder state, following which the negative electrode active material in the powder state was sieved using a mesh (53 μm).

When the state of the negative electrode active material was observed using a scanning electron microscope (SEM), the negative electrode active material remained in the powder state without being melted, even though the pulverized frames were heated at a temperature (=950° C.) higher than the glass transition temperature (=about 700° C.) of the silicate glass in the carbon reduction treatment. The reason for this is considered to be that the center part including the carbon-reduced silicate glass was covered with the covering part.

When the negative electrode active material was analyzed using X-ray diffraction analysis (XRD), a broad halo pattern was detected within the range of 2θ from 20° to 25° both inclusive, despite the carbon reduction treatment of the silicate glass. Accordingly, it was confirmed that the negative electrode active material (carbon-reduced silicate glass) had not been crystallized.

When the negative electrode active material was analyzed using Raman spectroscopy, distinct G and D bands were detected in the Raman spectrum. Accordingly, it was confirmed that the center part was covered with the covering part including carbon as a constituent element.

The results of analysis of the negative electrode active material using XPS are as listed in Table 2. In this case, the position of the apex XAT (binding energy: eV), the presence or absence of the shoulder XAS, the half-width of the peak XA (eV), and the area ratio S2/S1 were examined on the basis of the result of analysis of the negative electrode active material (XPS spectra of Si2p illustrated in FIG. 2) in accordance with the procedure described above.

The results of analysis of the negative electrode active material using Raman spectroscopy are as listed in Table 2. In this case, the position of the apex RAT (Raman shift: $cm^{-1}$) was examined on the basis of the result of analysis of the negative electrode active material (Raman spectra illustrated in FIG. 3) in accordance with the procedure described above.

The test electrode 111 was fabricated and an electrolytic solution was prepared, following which the secondary battery of the coin type was assembled in accordance with the following procedure.

Here, a negative electrode was fabricated as the test electrode 111. First, the negative electrode active material described above, a negative electrode binder precursor (polyamic acid solution (polyimide precursor), U-varnish-A, manufactured by Ube Industries, Ltd.), and a negative electrode conductor (carbon powder KS6 manufactured by TIMCAL Co., Ltd., and acetylene black, Denca black (registered trademark) manufactured by Denka Co., Ltd.) were mixed to thereby obtain a negative electrode mixture. In this case, the mixing ratio (mass ratio) among the negative electrode active material, the negative electrode binder precursor, and two kinds of negative electrode conductors was 7:0.5:1:0.25. Thereafter, the negative electrode mixture was put into an organic solvent (N-methyl-2-pyrrolidone), following which the organic solvent was stirred to thereby prepare a negative electrode mixture slurry in a paste state.

Thereafter, the negative electrode mixture slurry was applied to one side of a negative electrode current collector (copper foil, thickness=15 μm) using a coating apparatus, following which the negative electrode mixture slurry was heated and dried (heating temperature=425° C.) in a vacuum sintering furnace. A negative electrode binder (polyimide) was thereby synthesized, forming a negative electrode active material layer including the negative electrode active material, the negative electrode binder, and the negative electrode conductor. Lastly, the negative electrode current collector on which the negative electrode active material layer had been formed was punched into a disk shape (outer diameter=15 mm), and the punched negative electrode active material layer was compression-molded using a roll pressing machine. As a result, the test electrode 111 which is the negative electrode was fabricated.

Note that, a test electrode 111 for comparison was prepared (Experiment example 16) by a similar procedure except that another negative electrode active material (silicon monoxide (SiO)) was used instead of the negative electrode active material described above.

As the counter electrode 113, a lithium metal plate was used. In this case, lithium metal foil was punched into a disk shape (outer diameter=15 mm).

An electrolyte salt (lithium hexafluoride phosphate) was added to a solvent (ethylene carbonate, fluoroethylene carbonate, and dimethyl carbonate), following which the solvent was stirred. In this case, the mixing ratio (mass ratio) of the solvent among ethylene carbonate, fluoroethylene carbonate, and dimethyl carbonate was 40:10:50. The content of the electrolyte salt was 1 mol/kg with respect to the solvent.

First, the test electrode 111 was housed inside the outer package cup 114, and the counter electrode 113 was housed inside the outer package can 112. Thereafter, the test electrode 111 housed inside the outer package cup 114 and the counter electrode 113 housed inside the outer package can 112 were stacked on each other with the separator 115 (microporous polyethylene film, thickness=5 μm), impregnated with the electrolytic solution, interposed therebetween. Thus, the test electrode 111 and the counter electrode 113 were each impregnated with a portion of the electrolytic solution contained in the separator 115. Lastly, the outer package can 112 and the outer package cup 114 were crimped to each other by means of the gasket 116 in a state where the test electrode 111 and the counter electrode 113 were stacked on each other with the separator 115 interposed therebetween. Accordingly, the test electrode 111, the counter electrode 113, the separator 115, and the electrolytic solution were sealed by the outer package can 112 and the outer package cup 114. As a result, the secondary battery of the coin type was completed.

Evaluation of a battery characteristic (a charging characteristic, a discharging characteristic, and a cyclability characteristic) of the secondary batteries revealed the results listed in Table 2.

In a case of examining the battery characteristic, first, the secondary battery was charged and discharged for one cycle in an ambient temperature environment (temperature=23° C.) to stabilize a state of the secondary battery. Thereafter, the secondary battery was charged in the same environment, and a second-cycle charge capacity (mAh) was measured. A charge capacity per unit weight (mAh/g) was thereby calculated on the basis of the weight (g) of the negative electrode active material in order to evaluate the charge characteristic.

Thereafter, the secondary battery in a charged state was discharged in the same environment, and a second-cycle discharge capacity (mAh) was measured. A discharge capacity per unit weight (mAh/g) was thereby calculated on the basis of the weight (g) of the negative electrode active material in order to evaluate the discharge characteristic.

Thereafter, the secondary battery was repeatedly charged and discharged in the same environment until the total number of cycles of charging and discharging reached 100 cycles, and a 100th-cycle discharge capacity (mAh) was measured. Lastly, to evaluate the cyclability characteristic, a capacity retention rate was calculated as follows: capacity retention rate (%)=(100th-cycle discharge capacity (mAh)/second-cycle discharge capacity (mAh))×100.

Upon charging, the secondary battery was charged with a constant current of 0.1 C until the voltage reached 4.20 V, following which the secondary battery was charged with a constant voltage of 4.20 V until the current reached 0.05 C. Upon discharging, the secondary battery was discharged with a constant current of 0.1 C until the voltage reached 2.50 V. "0.1 C" refers to a value of a current that causes a battery capacity (theoretical capacity) to be completely discharged in 10 hours, and "0.05 C" refers to a value of a current that causes the battery capacity described above to be completely discharged in 20 hours.

As apparent from Tables 1 and 2, the battery characteristic of the secondary battery greatly varied depending on the composition and the physical property of the negative electrode active material.

Specifically, in a case where the composition of the negative electrode active material satisfied the following constitutional conditions and where the results of analysis of the negative electrode active material using XPS and Raman spectroscopy (the XPS spectrum of Si2p and the Raman spectrum) satisfied the following physical property conditions (e.g., Experiment example 1), a high capacity retention rate was obtained while a high charge capacity and a high discharge capacity were secured regardless of the kind of the carbon source, as compared with a case where the constitutional conditions and the physical property conditions were not satisfied (e.g., Experiment example 3).

The constitutional conditions regarding the composition of the negative electrode active material are as follows: The negative electrode active material includes silicon, oxygen, the first element, the second element, and the third element as constituent elements. The content of silicon with respect to all of the constituent elements excluding oxygen and carbon is 60 at % or greater and 98 at % or less. The content of the first element with respect to all of the constituent elements excluding oxygen and carbon is 1 at % or greater and 25 at % or less. The content of the second element with respect to all of the constituent elements excluding oxygen and carbon is 1 at % or greater and 34 at % or less. The content of the third element with respect to all of the constituent elements excluding oxygen and carbon is 0 at % or greater and 6 at % or less.

The physical property conditions regarding the results of analysis of the negative electrode active material are as follows: In the XPS spectrum (Si2p) measured using XPS, the peak XA is detected which has the apex XAT (at a position within a range of the binding energy from 102 eV to 105 eV both inclusive) and the shoulder XAS illustrated in FIG. 2. In addition, in the Raman spectrum measured using Raman spectroscopy, the peak RA is detected which has the apex RAT (at a position within a range of the Raman shift from 435 $cm^{-1}$ to 465 $cm^{-1}$ both inclusive) illustrated in FIG. 3.

In particular, in a case where the above-described constitutional conditions regarding the composition of the negative electrode active material were satisfied and where the above-described physical property conditions regarding the results of analysis of the negative electrode active material were satisfied, a high capacity retention rate was obtained together with a sufficient charge capacity and a sufficient discharge capacity if the half-width was 4.0 eV or greater or the area ratio S2/S1 was 0.85 or greater.

In the case where the above-described constitutional conditions regarding the composition of the negative electrode active material were satisfied and where the above-described physical property conditions regarding the results of analysis of the negative electrode active material were satisfied, substantially similar performance was obtained, as compared with a case where an existing other negative electrode active material (SiO) was used (Experiment example 16).

Specifically, in a case where the negative electrode active material satisfying the constitutional conditions and the physical property conditions described above was used, each of the charge capacity and the discharge capacity was decreased, as compared with the case where the other negative electrode active material was used. However, each of the charge capacity and the discharge capacity was sufficiently high within an acceptable range.

Moreover, in the case where the negative electrode active material satisfying the constitutional conditions and the physical property conditions described above was used, the capacity retention rate was greatly increased, as compared with the case where the other negative electrode active material was used.

Accordingly, in the case where the negative electrode active material satisfying the constitutional conditions and the physical property conditions described above was used, the capacity retention rate was markedly improved while each of the charge capacity and the discharge capacity was secured, as compared with the case where the other negative electrode active material was used.

As in the results listed in Tables 1 and 2, in the case where the above-described constitutional conditions regarding the composition of the negative electrode active material were satisfied and where the above-described physical property conditions regarding the results of analysis of the negative electrode active material were satisfied, a superior cyclability characteristic was obtained together with a superior charge characteristic and a superior discharge characteristic. Accordingly, a superior battery characteristic was obtained in the secondary battery.

Although the technology has been described above with reference to the embodiments and Examples, configurations of the technology are not limited to those described with reference to the embodiments and Examples above, and are therefore modifiable in a variety of ways.

Specifically, although the description has been given of the case where the liquid electrolyte (electrolytic solution) and the gel electrolyte (electrolyte layer) are used, the electrolyte is not limited to a particular kind. Alternatively, an electrolyte in a solid state (solid electrolyte) may be used.

Moreover, although the description has been given of the case where the structure of the secondary battery is of the laminated-film type, the cylindrical type, or the coin type, the structure is not limited to a particular structure. Alternatively, the secondary battery may have other structures including, without limitation, those of a prismatic type and a button type.

Moreover, although the description has been given of the case where the structure of the battery device is of the wound type or the stacked type, the structure of the battery device is not limited to a particular structure. Alternatively, the battery device may have other structures including, without limitation, those of a zigzag folded type in which the electrodes (the positive electrode and the negative electrode) are folded in a zigzag manner.

Further, although the description has been given of the case where the electrode reactant is lithium, the electrode reactant is not limited to a particular element. Specifically, the electrode reactant may be another alkali metal such as sodium or potassium, or may be an alkaline earth metal such as beryllium, magnesium, or calcium, as described above. Alternatively, the electrode reactant may be another light metal such as aluminum.

Note that the effects described herein are mere examples, and effects of the technology are therefore not limited to those described herein. Accordingly, the technology may achieve any other suitable effect according to an embodiment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An active material comprising, as constituent elements:
   silicon (Si);
   oxygen (O);
   a first element including boron (B), phosphorus (P), or both;
   a second element including at least one of an alkali metal element, a transition element, or a typical element, the typical element excluding silicon, oxygen, boron, phosphorus, an alkali metal element, and an alkaline earth metal element; and
   wherein
   a content of silicon with respect to the constituent elements excluding oxygen and carbon (C) is 60 atomic percent or greater and 98 atomic percent or less,
   a content of the first element with respect to the constituent elements excluding oxygen and carbon is 1 atomic percent or greater and 25 atomic percent or less,
   a content of the second element with respect to the constituent elements excluding oxygen and carbon is 1 atomic percent or greater and 34 atomic percent or less,
   a first peak is detected in an XPS spectrum of Si2p relating to the active material, the XPS spectrum of Si2p being measured using X-ray photoelectron spectroscopy (XPS) and defined by a horizontal axis indicating a binding energy (electronvolt) and a vertical axis indicating a spectrum intensity, the first peak including an apex within a range of the binding energy of 102 electronvolts or greater and 105 electronvolts or less, and a shoulder on a smaller binding energy side of the apex, and
   a second peak is detected in a Raman spectrum relating to the active material, the Raman spectrum being measured using Raman spectroscopy and defined by a horizontal axis indicating a Raman shift ($cm^{-1}$) and a vertical axis indicating a spectrum intensity, the second peak including an apex within a range of the Raman shift of 435 $cm^{-1}$ or greater and 465 $cm^{-1}$ or less.

2. The active material according to claim 1, wherein the first peak has a half-width of 4.0 electronvolts or greater.

3. The active material according to claim 1, wherein, in a case where the first peak is decomposed into a $Si^0$ peak, a $Si^{1+}$ peak, a $Si^{2+}$ peak, a $Si^{3+}$ peak, and a $Si^{4+}$ peak, a ratio S2/S1 of a sum S2 of an area of the $Si^0$ peak, an area of the $Si^{1+}$ peak, an area of the $Si^{2+}$ peak, and an area of the $Si^{3+}$ peak to an area S1 of the $Si^{4+}$ peak is 0.85 or greater.

4. The active material according to claim 1, comprising:
   a center part including silicon, oxygen, the first element and the second element as constituent elements, wherein the first peak is detected in the XPS spectrum relating to the active material, and the second peak is detected in the Raman spectrum relating to the active material; and
   a covering part covering at least a portion of a surface of the center part and including carbon as a constituent element.

5. A method of manufacturing an active material, the method comprising:
   preparing silicate glass including, as constituent elements,
   silicon (Si),
   oxygen (O),
   a first element including boron (B), phosphorus (P), or both, and
   a second element including at least one of an alkali metal element, a transition element, or a typical element, the typical element excluding silicon, oxygen, boron, phosphorus, an alkali metal element, and an alkaline earth metal element;
   mixing the silicate glass with a carbon source to thereby obtain a mixture of the silicate glass and the carbon source; and
   heating the mixture to thereby manufacture an active material including silicon, oxygen, the first element as constituent elements, wherein, in the active material,
   a content of silicon with respect to the constituent elements excluding oxygen and carbon (C) is 60 atomic percent or greater and 98 atomic percent or less,
   a content of the first element with respect to the constituent elements excluding oxygen and carbon is 1 atomic percent or greater and 25 atomic percent or less, and
   a content of the second element with respect to the constituent elements excluding oxygen and carbon is 1 atomic percent or greater and 34 atomic percent or less.

6. The method of manufacturing the active material according to claim 5, wherein the carbon source includes a carbon material, a carbonizable organic substance, or both.

7. An electrode comprising an active material according to claim 1.

8. A secondary battery comprising:
   a positive electrode;
   a negative electrode including a negative electrode active material; and
   an electrolytic solution, wherein
   the negative electrode active material includes, as constituent elements,
   silicon (Si),
   oxygen (O),
   a first element including boron (B), phosphorus (P), or both, and
   a second element at least one of an alkali metal element, a transition element, or a typical element, the typical element excluding silicon, oxygen, boron, phosphorus, an alkali metal element, and an alkaline earth metal element,
   a content of silicon with respect to the constituent elements excluding oxygen and carbon (C) is 60 atomic percent or greater and 98 atomic percent or less,
   a content of the first element with respect to the constituent elements excluding oxygen and carbon is 1 atomic percent or greater and 25 atomic percent or less, and a content of the second element with respect to the constituent elements excluding oxygen and carbon is 1 atomic percent or greater and 34 atomic percent or less, a first peak is detected in an XPS spectrum of Si2p relating to the active material, the XPS spectrum of Si2p being measured using X-ray photoelectron spectroscopy (XPS) and defined by a horizontal axis indicating a binding energy (electronvolt) and a vertical axis indicating a spectrum intensity, the first peak including an apex within a range of the binding energy of 102 electronvolts or greater and 105 electronvolts or less and a shoulder on a smaller binding energy side of the apex, and a second peak is detected in a Raman spectrum relating to the active material, the Raman spectrum being measured using Raman spectroscopy and defined by a horizontal axis indicating a Raman shift ($cm^{-1}$) and a vertical axis indicating a spectrum intensity, the second peak including an apex within a range of the Raman shift of 435 $cm^{-1}$ or greater and 465 $cm^{-1}$ or less.

9. The secondary battery according to claim 8, wherein the secondary battery comprises a lithium-ion secondary battery.

10. The active material according to claim 1, wherein the active material further includes a third element including an alkaline earth metal element.

11. The active material according to claim 10, wherein a content of the third element with respect to the constituent elements excluding oxygen and carbon is 6 atomic percent or less.

12. The method according to claim 5, wherein the active material further includes a third element including an alkaline earth metal element.

13. The method according to claim 12, wherein a content of the third element with respect to the constituent elements excluding oxygen and carbon is 6 atomic percent or less.

14. The secondary battery according to claim 8, wherein the negative electrode active material further includes a third element including an alkaline earth metal element.

15. The secondary battery according to claim 14, wherein a content of the third element with respect to the constituent elements excluding oxygen and carbon is 6 atomic percent or less.

* * * * *